(12) United States Patent
Day

(10) Patent No.: US 12,514,931 B2
(45) Date of Patent: Jan. 6, 2026

(54) MICROSPHERE-DRUG COMBINATION

(71) Applicant: UCL Business LTD, London (GB)

(72) Inventor: Richard Michael Day, London (GB)

(73) Assignee: UCL Business LTD, London (GB)

( * ) Notice: Subject to any disclaimer, the term of this patent is extended or adjusted under 35 U.S.C. 154(b) by 544 days.

(21) Appl. No.: 17/768,621

(22) PCT Filed: Sep. 25, 2020

(86) PCT No.: PCT/GB2020/052330
§ 371 (c)(1),
(2) Date: Apr. 13, 2022

(87) PCT Pub. No.: WO2021/074584
PCT Pub. Date: Apr. 22, 2021

(65) Prior Publication Data
US 2024/0042056 A1    Feb. 8, 2024

(30) Foreign Application Priority Data
Oct. 14, 2019  (GB) ..................... 1914849

(51) Int. Cl.
| A61K 47/69 | (2017.01) |
| A61K 35/00 | (2006.01) |
| A61K 47/59 | (2017.01) |
| A61P 35/00 | (2006.01) |

(52) U.S. Cl.
CPC ........ *A61K 47/6927* (2017.08); *A61K 47/593* (2017.08); *A61P 35/00* (2018.01)

(58) Field of Classification Search
CPC .... A61K 47/6927; A61K 47/593; A61P 35/00
See application file for complete search history.

(56) References Cited

FOREIGN PATENT DOCUMENTS

| CN | 108670960 A | * 10/2018 | ........... A61K 31/337 |
| WO | 2007090897 A1 | 8/2007 | |
| WO | 2008155558 A2 | 12/2008 | |
| WO | 2010009735 A2 | 1/2010 | |
| WO | WO-2015097464 A1 | * 7/2015 | ........... A61K 31/704 |
| WO | 2019164397 A1 | 8/2019 | |

OTHER PUBLICATIONS

Machine translation of CN-108670960-A (Year: 2018).*
Herbst et al.; Mode of action of docetaxel—a basis for combination with novel anticancer agents; Elsevier Science Ltd; Cancer Treatment Reviews 2003; 29: 407-415 (Year: 2003).*
Mar. 30, 2020—(GB) Search Report—Appl. No. GB1914849.3.
Awwad et al., "Sustained release opthalmic dexamethasone: In vitro in vivo correlations derived from the PK-Eye," International Journal of Pharmaceutics, vol. 522, No. 1, pp. 119-127 (2017).
Dec. 14, 2020—(WO) International Search Report—Appl. No. PCT/GB2020/052330.
Herbst et al., "Mode of action of docetaxel—a basis for combination with novel anticancer agents," Cancer Treatment Reviews, vol. 29, No. 5, pp. 407-415 (Jan. 1, 2003).
Ahmadi et al., "Enhanced attachment, growth and migration of smooth muscle cells on microcarriers produced using thermally induced phase separation," Acta Biomaterialia, vol. 7, No. 4, pp. 1542-1549 (Dec. 21, 2010).

* cited by examiner

*Primary Examiner* — Robert A Wax
*Assistant Examiner* — John W Lippert, III
(74) *Attorney, Agent, or Firm* — Banner & Witcoff, LTD

(57) ABSTRACT

The invention relates to a method for attaching a non-soluble active pharmaceutical ingredient (API) to a micro sphere produced by thermally induced phase separation (TIPS) comprising: i) mixing the micro sphere with an aqueous solution to form a first composition; ii) dissolving the non-soluble API in a first solvent and subsequently adding the non soluble API dissolved in the first solvent to the first composition to form a second composition; and iii) mixing the second composition. The invention further relates to a micro sphere produced by thermally induced phase separation which has a non-soluble API bound to its surface and a composition comprising said micro sphere for use in therapy.

16 Claims, 16 Drawing Sheets

(f)

(g)

(h)

(a)

(b)

a)

b)

c)

MICROSPHERE-DRUG COMBINATION

The invention relates to methods for attaching non-soluble active pharmaceutical ingredients (APIs) to microspheres produced by thermally induced phase separation (TIPS) as well as microspheres produced by thermally induced phase separation which have a non-soluble API bound to their surface and their uses thereof.

BACKGROUND OF THE INVENTION

Thermally induced phase separation (TIPS) microspheres, have been previously described in WO 2008/155558. The resulting structure of the microspheres provides improved characteristics such as mechanical strength and the ability to select pore size. TIPS microspheres provide a degradable scaffold structure to support tissue growth and can deliver bioactive agents to promote tissue generation as well as active pharmaceutical ingredients (APIs). The microspheres utilised in the present invention may be produced by the application of TIPS disclosed in WO 2008/155558 or by any other suitable method. The teaching of WO 2008/155558 is hereby incorporated by reference, especially with reference to the methods used to produce the TIPS microspheres. TIPS enables the rapid formation of evenly sized porous microspheres. TIPS microspheres are polymeric, biodegradable and can be loaded with therapeutics for drug delivery applications. The microspheres can be easily delivered to the required location, they can conform to the irregular shape of tissue cavities, they have predictable degradation times, they can deliver a wide range of drugs and they are cost effective to manufacture.

Cancer is one of the leading causes of death worldwide. Tumour resection is a common form of treatment but a positive surgical margin (defined as the histological presence of cancer cells at the inked margin of the excised specimen) following resection is associated with a higher risk of biochemical recurrence due to residual tumour left behind in the patient. Factors to take into consideration with a more aggressive approach to surgical resection that would be more certain of obtaining clear margins include comorbidity, anatomical factors and surgical experience. In prostate cancer, one of the most prevalent cancers among men, radical prostatectomy is a standard treatment option for cancer that is confined to the prostate gland but aggressive resection is associated with higher risk of urinary incontinence and erectile dysfunction due to collateral tissue damage (vascular damage to the Santorini plexus, epigastric vessels or iliac vessels; nerve injury). Despite being a curative treatment for localised disease, around 50% of patients with high-risk prostate cancer will develop biochemical recurrence following surgery within 5 years, which is associated with poor prognosis (Briganti A, Karnes R J, Gandaglia G, Spahn M, Gontero P, Tosco L, et al. Natural history of surgically treated high-risk prostate cancer. Urol Oncol. 2015 April; 33(4):163.e7-13). Many of these patients will require adjuvant or salvage (radiation) therapy or systemic hormonal therapy, which carry higher risks of functional impact on erectile function or urine control. Men who then fail these therapies will need third line hormonal or chemotherapy drugs that confer higher risk of toxicity. Since it is not possible to completely excise all of the tumour or residual cancerous cells with 100% certainty, new multimodal treatments that safely enable the targeted delivery of an anti-cancer drug during surgery straight after the tumour is removed might be beneficial to improve outcomes and reduce risk of recurrence and requirement for further therapy.

Chemotherapy is a common cancer treatment. However, clinical evidence of improved survival with systemic delivery of chemotherapeutic agents is often associated with numerous drug-related toxicities and non-specific distribution required to achieve the therapeutic effect, with only a small fraction of the drug reaching the tumour.

Docetaxel (DTX) is one such type of chemotherapeutic agent. It is a taxane-based chemotherapy which binds to intracellular β-tublin where it inhibits microtubule depolymerisation resulting in mitotic arrest and activation of signalling pathways associated with apoptosis (Herbst R S, Khuri F R. Mode of action of docetaxel—a basis for combination with novel anticancer agents. Cancer Treat Rev. 2003 October; 29(5):407-415).

Many tumour sites are anatomically accessible, such as the prostate, and are therefore a suitable target for direct delivery, especially with the advent of laparoscopic and robotic techniques. However, modelling of docetaxel delivery directly into the prostate has shown it is unlikely to be efficacious since directly delivered infusions readily pass into the urethra due to regions of tissue with high fluid conductivity (Raghavan R, Brady M L, Sampson J H. Delivering therapy to target: improving the odds for successful drug development. Ther Deliv. 2016 July; 7(7):457-481).

To achieve localised targeted delivery and to mitigate unwanted side-effects associated with the systemic delivery of chemotherapeutic agents, various polymer-based drug delivery systems have been investigated with the intention of achieving high therapeutic concentrations of chemotherapy at the site of malignant disease. These include polymer nanoparticles, liposomes, dendrimers and nanotubes. However, many nanoscale materials devised to date for anti-cancer drug delivery rely on intravenous administration and therefore require targeting of the drug to the tumour tissue at therapeutic concentrations. Moreover, their entry into the systemic circulation is likely to result in removal and sequestration by the reticuloendothelial system and off-target tissue accumulation, both of which are significant issues that need to be addressed when developing materials in the nanoscale range.

The present invention can provide localised controlled and sustained drug release when implanted into or adjacent to the tumour, thus increasing the likelihood of clinical efficacy and reducing off-target collateral tissue damage. The novel approach for adjuvant therapy allows administration of a drug delivery depot system at the time of tumour excision. Key attributes of this system intended to destroy residual cancer cells that remain after excision of the tumour include: (i) being capable of minimally invasive delivery through suitable gauge needle or delivery port; (ii) conformable to the shape of the tissue cavity that is created following excision of the tumour, so as to maximise the surface area of the medicinal product in close proximity to residual tumour cells; (iii) sustained delivery of a therapeutic dose; (iv) retention of the product at the target site; and (v) ideally translatable for clinical use within a short time-frame.

The present invention therefore relates to a novel controlled-release drug-delivery depot system that meets these target attributes by combining an API with an existing, clinically approved, biodegradable, highly porous microsphere made via thermally induced phase separation (TIPS) that can be delivered and will conform to the shape of the tissue cavity created immediately after excision of the tumour. The microspheres of the present invention can further act as a scaffold to facilitate the tissue repair process following surgery. The method of the present invention further provides a novel, facile and robust loading regime which achieves consistent amounts of API loaded onto the TIPS microspheres that is compatible with minimally invasive delivery at the time of surgery, and secondly, in vitro efficacy of the API-TIPS microspheres combination product.

SUMMARY OF THE INVENTION

According to a first aspect of the invention there is provided a method for attaching a non-soluble active pharmaceutical ingredient (API) to a microsphere produced by thermally induced phase separation (TIPS) comprising:
  i) mixing the microsphere with an aqueous solution to form a first composition;
  ii) dissolving the non-soluble API in a first solvent and subsequently adding the non-soluble API dissolved in the first solvent to the first composition to form a second composition; and
  iii) mixing the second composition.

This facile and robust method was used to load TIPS microspheres with a non-soluble API. This approach offers advantageous over other microsphere drug-device fabrication techniques, such as the solvent-emulsion evaporation process used to produce the PACLIMER® microspheres of the prior art, including avoiding exposure of the API to solvents during the fabrication process, and was capable of achieving high drug loading efficiencies. Moreover, the approach allows preparation of the drug-device combination immediately prior to use and allows the PLGA TIPS microspheres to be stored in a dry format, thus increasing their shelf-life by avoiding degradation.

According to a second aspect of the invention there is provided a microsphere produced by thermally induced phase separation which has a non-soluble API bound to its surface.

According to a third aspect of the invention there is provided a composition comprising the microsphere of the invention for use in therapy.

According to a fourth aspect of the invention, there is provided a composition comprising the microsphere of the invention for use in the treatment of cancer.

According to a fifth aspect of the invention, there is provided use of a composition comprising the microsphere of the invention in the manufacture of a medicament for the treatment of cancer.

According to a sixth aspect of the invention, there is provided a method of treating cancer comprising the administration to a subject in need of such treatment, of a composition comprising the microsphere of the present invention.

According to a seventh aspect of the invention, there is provided a kit for treating cancer comprising:
  i) TIPS microspheres provided in a sealed vessel;
  ii) a non-soluble API dissolved in a first solvent; and
  iii) a carrier vehicle.

The TIPS microspheres of the present invention provide a localised delivery and sustained release formulation of the API at the site of need and allow for increased local concentrations of the API at the tumour site, thereby reducing the risk of disease recurrence arising from incomplete tumour resection by destroying residual tumour cells. Moreover, such a localised delivery system reduces the risk of API losses within the circulation and off-target toxicity associated with chemotherapeutic agents delivered using conventional systemic delivery routes such as neutropenia, leukopenia, neurological toxic effects, diarrhoea, alopecia, asthenia and nausea.

DETAILED DESCRIPTION OF THE INVENTION

According to a first aspect of the invention there is provided a method for attaching a non-soluble active pharmaceutical ingredient (API) to a microsphere produced by thermally induced phase separation (TIPS) comprising:
  i) mixing the microsphere with an aqueous solution to form a first composition;
  ii) dissolving the non-soluble API in a first solvent and subsequently adding the non-soluble API dissolved in the first solvent to the first composition to form a second composition; and
  ii) mixing the second composition.

The present method allows for loading TIPS microspheres with a non-soluble API. As outlined above, the approach avoids exposure of the API agent to solvents during the fabrication process, and is capable of achieving high drug loading efficiencies.

The term "attachment" as used herein encompasses any form of attachment but preferably refers to passive attachment. Preferably the non-soluble API is precipitated onto the surface of the microsphere. The non-soluble API may adhere to the microsphere by physisorption. Preferably the non-soluble API is precipitated onto the surface of the microsphere in crystalline form.

By "non-soluble" it is meant that the API is not soluble in an aqueous solution.

The term API as used herein means a substance which can be used in a finished pharmaceutical product and is intended to furnish pharmacological activity or to otherwise have direct effect in the diagnosis, cure, mitigation, treatment or prevention of disease, or to have direct effect in restoring, correcting or modifying physiological functions in human beings.

The term "microsphere" refers to one of a preparation of substantially spherical particles. The term is well known in the art. Microspheres may contain a number of radial pores. This means that the pores extend from the central part of the microsphere towards the surface, preferably substantially parallel to the radii of the microsphere. The pores are preferably tubular and interconnected. The radial pores provide the microspheres with a level of mechanical strength.

The structure is produced by thermally induced phase separation. In particular, the structure may be produced by any of the methods disclosed in WO 2008/155558, the disclosure of which is incorporated by reference in its entirety.

The method comprises mixing the microspheres with an aqueous solution to form a first composition. Preferably the aqueous solution comprises water, saline or Ringer's solution, or mixtures thereof. If water is used, the water may further comprise sodium chloride and/or dextrose. The mixing may be performed by any suitable means such as shaking, rotating, rolling or vortexing. Preferably the mixing is carried out by vortexing for a suitable period of time such as 2, 5, 10, 15 or seconds. Preferably the vortexing is carried out for about 10 seconds.

In one embodiment, the microspheres are mixed with the aqueous solution to form a first composition in a vessel. The vessel may be any suitable vessel known to one skilled in the art such as a beaker, flask, bottle, jar, test tube, cylinder, centrifuge tube, microfuge tube or vial. Preferably the vessel is a vial. The vessel may be made from any suitable material which the API does not adsorb to such as plastic or glass. Preferably the vessel is made from glass, such as borosilicate glass. Preferably the vessel is a glass vial, a freeze drying vial or a siliconised vial, more preferably a borosilicate glass vial.

The volume of aqueous solution may be any volume suitable to the utilised vessel. For example, when the vessel is a 20 ml vial, the volume of water may be from 0.5 to 5 ml, preferably from 1.5 to 4.5 ml, more preferably from 3 to 4.5 ml.

Preferably the vessel is sealed during mixing by any suitable means known to one skilled in the art. Such means include lids, caps, bungs, stoppers or parafilm. Preferably the vessel is sealed with a stopper. An example of a preferred stopper is a butyl injection stopper.

The non-soluble API is dissolved in a first solvent. The first solvent may be selected from the the Q3C—Tables and List Guidance for Industry, known to one skilled in the art (http://academy.gmp-compliance.org/guidemgr/files/UCM073395.PDF). Preferably the solvent is selected from a Class 3 solvent.

The first solvent may be selected from acetic acid, acetone, nitromethane, dioxane, tetrahydrofuran, pyridine, methyl ethyl ketone, DMSO, methyl acetate, halogenated hydrocarbons, glycerine, toluene, formamide, propylene glycol, polyethylene glycol, lower alcohols and mixtures thereof. The halogenated hydrocarbons include, but are not limited to, dichloromethane, chloroform, tetrachloroethane and trichloroethane. Lower alcohols include, but are not limited to, isopropyl alcohol, methanol and ethanol.

Preferably the solvent is a lower alcohol, and most preferably the solvent is ethanol. Preferably the ethanol is 45% to 100% ethanol, more preferably 95% or 100% ethanol.

Preferably the first solvent is added to the non-soluble API in such a volume so as to result in a final concentration in the second composition of from 1 to 30% v/v, preferably 10 to 30% v/v, more preferably 10 to 20% v/v and most preferably 10% v/v. At concentrations above 30% v/v in the second composition the microspheres may clump together.

Following the dissolution of the non-soluble API in the first solvent, the non-soluble API dissolved in the first solvent is added to the first composition to form the second composition. Preferably, during this step, the vessel comprising the microspheres and aqueous solution is inverted resulting the microspheres moving away from the rubber stopper sealing the opening of the vial. Diluting the first solvent in the aqueous solution present in the first composition prevents the microspheres from coming into direct contact with the first solvent which may result in clumping of the microspheres.

Preferably the addition of the non-soluble API dissolved in the first solvent to the first composition is via a needle. Preferably a syringe with the needle attached is used to pierce a rubber stopper sealing the vial while the vial is inverted.

The second composition is then mixed. The mixing may be performed by any suitable means such as shaking, rotating, rolling or vortexing. Preferably the mixing is carried out by vortexing for a suitable period of time such as 2, 5, 10, 15 or seconds. Preferably the vortexing is carried out for about 10 seconds. Preferably the vortexing is then followed by a period of rotating or rolling, for example for between 5 minutes and 24 hours, preferably for between 30 minutes and 60 minutes.

The thermally induced phase separation preferably comprises:
 i) dissolving a polymer in a second solvent to form a solution;
 ii) quenching droplets of the solution in a quenching fluid; and
 iii) freeze-drying the resultant spheres, preferably wherein the solution is introduced into the quench using a syringe, a vibrating needle or atomiser and more preferably further comprising the step of sonicating the solution.

Any hydrophobic polymer may be used, but the polymer is preferably pharmaceutically acceptable and completely soluble in a solvent. The polymer may be degradable or non-degradable. It may be synthetic or non-synthetic. A combination of polymers can be used, for example, a synthetic polymer used in combination with a non-synthetic polymer. Example polymers include poly(lactide-co-glycolide) (PLGA), poly(α-hydroxyester), polyanhydrides, polyorthoesters, polyphosphazines, polypropylene fumarate, poly(propylene-fumarate-co-ethylene glycol), polyethylene oxide, polyhydroxybutyrate (PHB) and polyhydroxyvalerate (PHV). Co-polymers of two or more polymers may also be used, especially of PHB and PHV. Others include poly(α-hydroxyester)-co-PEG copolymer, or co-polymers including a pegylated drug. Natural polymers that may be used include fibrin. Preferably the polymer is not chitosan.

The type of polymer (e.g. permanent or degradable, natural or synthetic), porosity, mechanical strength and size may be selected depending on the use or chosen site of delivery of the microsphere. For example, degradable material may be preferred where tissue from the site of delivery is to replace the temporary scaffold function of the structure. Most preferably, the polymer is poly(lactide-co-glycolide) (PLGA).

The second solvent is selected to have a higher freeze temperature higher than the temperature of the quench fluid. Example second solvents include dimethylcarbonate, chloroform, acetone, dimethylchloride, tetrahydrofuran and supercritical carbon dioxide. Preferably the second solvent is dimethyl carbonate.

Preferably the method further comprises the step of sonicating the solution.

The quenching fluid used to form the microsphere may be a liquid or a gas. Example quenching fluids include liquid nitrogen, liquid oxygen, liquid $CO_2$, freon, water, ethanol, methanol. Preferably the quenching fluid is liquid nitrogen.

The solution may be introduced into the quenching fluid using any appropriate method. For example, droplets may be produced using a syringe or a vibrating needle. Alternatively, the solution may be sprayed through an atomiser, using, for example, an aerosol propelled or pumped system, or pulled into the quenching fluid using electrostatic force or coaxial air stream.

Preferably the non-soluble API is a chemotherapeutic agent. By "chemotherapeutic agent" it is meant that the agent is selectively destructive to malignant cells and tissues. Non-exhaustive examples of chemotherapeutic agents are alkylating agents such as chlorambucil, melphalan, dacarbazine, and temozolomide; anthracyclines such as idarubicin, and valrubicin; histone deacetylase inhibitors such as vorinostat and romidepsin; topoisomerase inhibitors such as etoposide, teniposide and tafluposide; kinase inhibitors such as bortezomib, erlotinib, gefitinib, imatinib, vemurafenib and vismodegib; nucleotide analogues and precursor analogues such as azacitidine, azathioprine, fluorouracil, mercaptopurine, methotrexate and tioguanine; platinum based agents such as carboplatin, cisplatin and oxaliplatin; retinoids such as tretinoin, alitretinoin and bexarotene; *vinca* alkaloids and derivates such as vinblastine andvindesine and taxanes such as cabazitaxel, paclitaxel and docetaxel.

Preferably the chemotherapeutic agent is a taxane, more preferably cabazitaxel, paclitaxel or docetaxel, even more preferably docetaxel.

Any non-soluble API which is unbound to the microspheres can be removed from the second composition by washing in an aqueous solution. Preferably the aqueous solution comprises water, saline, Ringer's solution or mixtures thereof. If water is used, the water may further comprise sodium chloride and/or dextrose. A non-limiting example of the washing procedure may comprise: (i) removing the API dissolved in the first solvent; (ii) adding an equivalent volume of the aqueous solution; and (iii) washing by any suitable means such as shaking, rotating, rolling or vortexing. Preferably the washing is carried out by vortexing for a suitable period of time such as 10 seconds to 5 minutes. Preferably the vortexing is carried out for about 2 minutes. After this step the aqueous solution may be removed. Preferably removal is carried out via aspiration.

A second aspect of the invention relates to a microsphere produced by thermally induced phase separation which has a non-soluble API bound to its surface.

Preferably the non-soluble API is bound to the microsphere via the methods described above.

Preferably the thermally induced phase separation comprises:
  i) dissolving a polymer in a solvent to form a solution;
  ii) quenching droplets of the solution in a quenching fluid; and
  iii) freeze-drying the resultant spheres, preferably wherein the solution is introduced into the quench using a syringe, a vibrating needle or atomiser and more preferably further comprising the step of sonicating the solution.

The solvent in this embodiment of the invention is the second solvent as described in the above method.

Preferably the polymer is PLGA, the solvent is dimethyl carbonate, and/or the quenching fluid is liquid nitrogen.

The term "microsphere" s defined above and as used herein may encompass a substantially spherical particle which is of a size suitable for the attachment the non-soluble API. Preferably, the microsphere is about 10 to 900 μm in diameter as characterised by electron microscopy, such as scanning electron microscopy. Preferably the microsphere may be around 50 to 450 μm in diameter, more preferably around 100 to 400 μm in diameter, and even more preferably between 250 and 350 μm in diameter.

The preferable size range of 250 to 350 μm is such that the microspheres can be easily delivered to a patient via a suitable gauge needle or delivery port via a minimally invasive approach whilst providing sufficiently large interstices between packed microspheres to increase the surface area for drug release and allow tissue infiltration between the close packed microspheres.

The pore size of the microsphere may also be selected according to the intended use and required mechanical strength and may be selected depending on diameter of the microsphere. Further, the pores are preferably regular in size. That is to say the pores are preferably substantially the same diameter, i.e., the diameter of the pores preferably differs by 10% or less. Porous microspheres have good mechanical strength due to the nature of the pores.

A third aspect of the invention relates to a composition comprising the microsphere of the invention for use in therapy.

According to a fourth aspect of the invention, there is provided a composition comprising the microsphere of the invention for use in the treatment of cancer.

When cancer is "treated", this means that one or more clinical manifestations of cancer are ameliorated. It does not mean that the symptoms of cancer are completely remedied so that they are no longer present in the patient, although in some methods, this may be the case. "Treatment" results in one or more of the symptoms of cancer being less severe than before treatment. For example, a tumour may be reduced in size or eradicated entirely.

The cancer may be any type of cancer, preferably carcinoma, sarcoma or lymphoma. Preferably the cancer is selected from prostate, breast, bladder, colorectal, thyroid, oral, lung, kidney, uterine or ovarian cancer. More preferably the cancer is prostate cancer. In a particularly preferred embodiment, a patient with prostate cancer has had a radical prostatectomy.

The composition comprising the microspheres of the present invention can be administered directly into a tissue cavity that is created following a tumour resection or, for example, a radical prostatectomy. In addition to delivering the chemotherapeutic agent directly to the site of need, the TIPS microspheres can act as a conformable tissue scaffold following the surgery. The microspheres can be easily delivered via a suitable gauge needle or delivery port via a minimally invasive approach whilst providing sufficiently large interstices between packed microspheres to increase the surface area for drug release and allow tissue infiltration between the close packed microspheres.

According to a fifth aspect of the invention, there is provided use of a composition comprising the microsphere of the invention in the manufacture of a medicament for the treatment of cancer.

According to a sixth aspect of the invention, there is provided a method of treating cancer comprising the administration to a subject in need of such treatment, of a composition comprising the microsphere of the present invention.

According to a seventh aspect of the invention, there is provided a kit for treating cancer comprising:
  i) TIPS microspheres provided in a sealed vessel;
  ii) a non-soluble API dissolved in a first solvent; and
  iii) a carrier vehicle.

The vessel may be any suitable vessel known to one skilled in the art such as a beaker, flask, bottle, jar, test tube, cylinder, centrifuge tube, microfuge tube or vial. Preferably the vessel is a vial. The vessel may be made from any suitable material which the API does not adsorb to such as plastic or glass. Preferably the vessel is made from glass, such as borosilicate glass. Preferably the vessel is a glass vial, a freeze drying vial or a siliconised vial, more preferably a borosilicate glass vial.

Preferably the vessel is sealed under vacuum. Dry TIPS microspheres under such conditions have a shelf life of over six years.

The non-soluble API and first solvent are as described above.

The carrier vehicle may comprise suitable one or more suitable excipients. Acceptable excipients for therapeutic use are well known in the pharmaceutical art, and are described, for example, in Remington's Pharmaceutical Sciences, Mack Publishing Co. (A. R. Gennaro edit. 1985). The vehicle may comprise as, or in addition to, the excipient, any suitable binder, lubricant, suspending agent, coating agent or solubilising agent. In one embodiment, the carrier vehicle may comprise a hydrogel.

The kit may further comprise an aqueous solution suitable for delivery in an injectable form. The aqueous solution may comprise water, saline or Ringer's solution, or mixtures thereof. Where the aqueous solution is water, the water may further comprise sodium chloride and/or dextrose.

The kit may further comprise a syringe, needle and/or cannula of suitable gauge, for example from 16G to 30G, for the delivery of the microspheres in the carrier vehicle to the patient.

A skilled person will appreciate that all aspects of the invention, whether they relate to, for example, the method of attachment, the microsphere, its use, or a method of treatment are equally applicable to all other aspects of the invention. In particular, aspects of the method of attachment for example, may have been described in greater detail than in other aspects of the invention, for example, the use of the microspheres. However, the skilled person will appreciate where more detailed information has been given for a particular aspect of the invention, this information is generally equally applicable to other aspects of the invention.

The invention will now be described in further detail, by way of example only, with reference to the drawings, in which:

FIG. 1 illustrates one example of the loading process of DTX onto the TIPS microspheres. (i) 5 mg of PLGA TIPS microspheres in 20 ml clear Type 1B boroscilicate glass vials and sealed with a butyl injection stopper. (ii) 4.5 mL of ultrapure water added to the vial. (iii) Vial vortexed for 10 seconds. (iv) 0.5 ml of 0.1% (w/v) docetaxel in ethanol added using a 1 mL syringe with a 25G needle through the rubber stopper, whilst the vial is inverted. (v) Vial then vortexed for 10 seconds and placed on a roller mixer (IKA® Roller 6 Digital; 60 rpm) at room temperature for predetermined period.

FIG. 2 shows the immobilisation of taxanes onto PLGA TIPS microspheres. (a) The amount of DTX loaded onto the microspheres was indirectly quantified by calculating the amount of DTX remaining in solution (measured by UV absorption) at different time points during the loading phase. Representative scanning electron microscopy (SEM) images of (b) unloaded control TIPS microspheres and (c) DTX-TIPS microspheres loaded with 500 μg of DTX. (d) SEM images demonstrating the time-dependent adsorption of DTX to the surface of TIPS microspheres. (e) XPS high-energy resolution spectra of nitrogen (Nis) obtained on the surface of the control TIPS microspheres or DTX-TIPS microspheres. (f) The rate of DTX loading is shown for dry TIPS PLGA microspheres, "pre-wetted" TIPS PLGA microspheres and PLGA polymer solid microparticles. (g) TIPS microspheres were loaded with docetaxel, paclitaxel and cabazitaxel via anti-solvent precipitation. Scanning electron microscopy of the microspheres revealed the presence of crystalline material on the surface of the microspheres incubated in the paclitaxel or cabazitaxel solution compared with unloaded control TIPS microspheres. (h) Docetaxel showed a faster rate of loading onto the microspheres compared with cabazitaxel. Approximately 80% of the docetaxel was loaded onto the microspheres from the solution within 60 minutes of initiating mixing. At the same time-point, about 60% of cabazitaxel was loaded onto the microspheres from the solution. No further increase in docetaxel loading was detected beyond 60 minutes during the loading phase.

FIG. 3 shows that excipients present in the paclitaxel for injection formulation (e.g. Taxol®) interfere with anti-solvent precipitation process and prevent loading of the drug onto the surface of the microspheres. Scanning electron microscopy of the microspheres revealed the presence of less crystalline material on the surface of the microspheres incubated in the injection formulation of docetaxel and paclitaxel compared with TIPS microspheres incubated with the pure formulation of docetaxel and paclitaxel without the addition of excipients.

FIG. 4 shows (a) Docetaxel for injection (e.g. Taxotere®) is formulated in a vehicle composed of 1:1 blend of Tween 80 and ethanol which is diluted further in saline before administration. (b) Paclitaxel for injection (e.g. Taxol®) is formulated in a vehicle composed of 1:1 blend of Cremophor EL and ethanol which is diluted 5-20 fold in saline before administration. Excipients present in the injection formulation interfere with anti-solvent precipitation process and prevent loading of the drug onto the surface of the microspheres.

Figure 9:
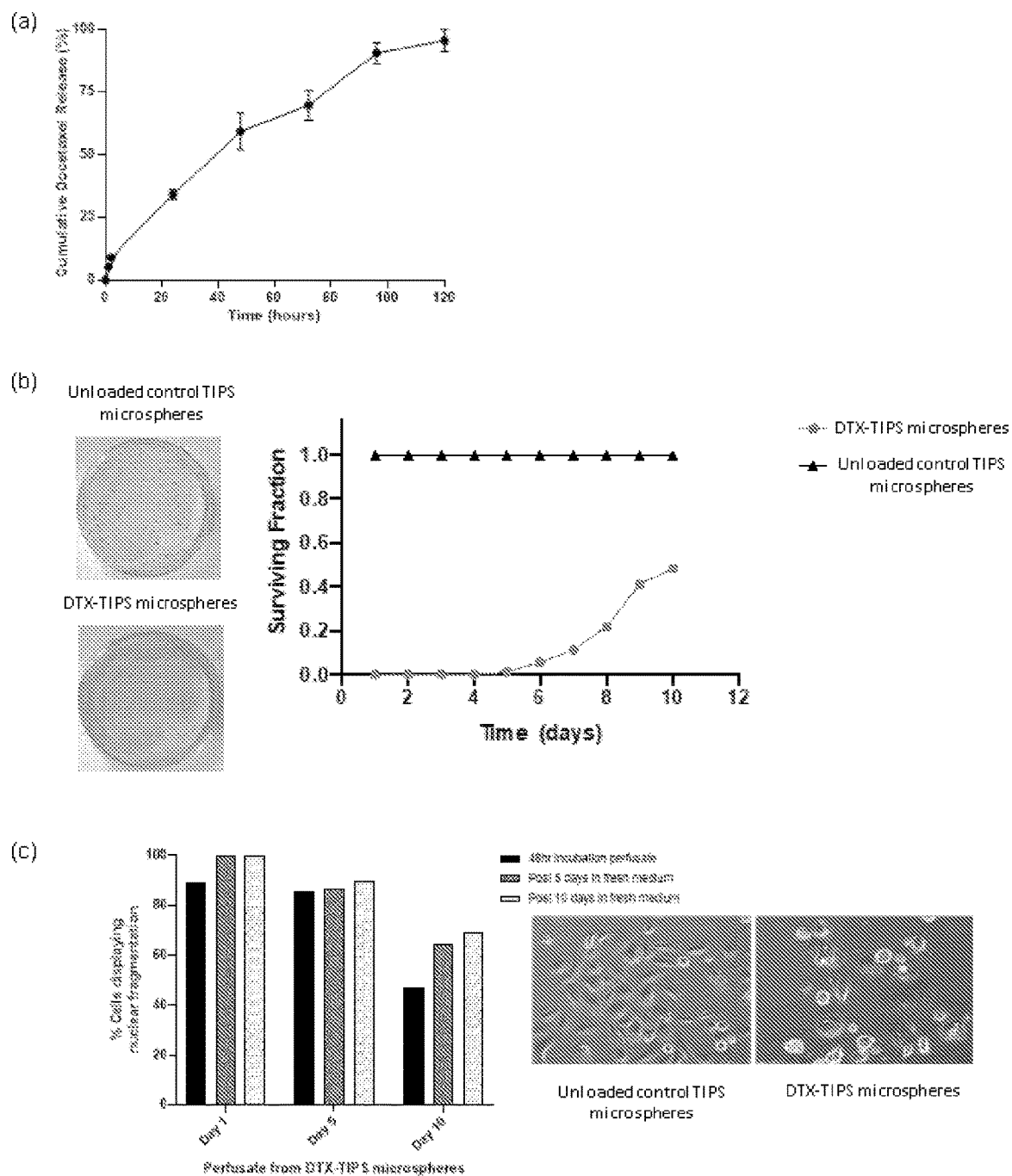

FIG. 9 shows (a) Cumulative release of DTX from DTX-TIPS microspheres measured using UV absorption at 229 nm. (b) Colony formation assay performed by incubating PC3 cells for 48 hours with perfusate collected at daily intervals from DTX-TIPS microspheres over a period of 12 days. The cells exposed to perfusate collected from the different time points were re-plated into petri dishes and incubated for 2 weeks before the stained colonies were counted. (c) Quantification of cells displaying morphological changes associated with apoptosis following incubation of PC3 cells for 48 hours with perfusate collected DTX-TIPS microspheres at Days 1, 5 and 10. Cell morphology was assessed at 48 hours post-incubation and at 5 and 10 days post-incubation in fresh complete medium.

Figure 10:
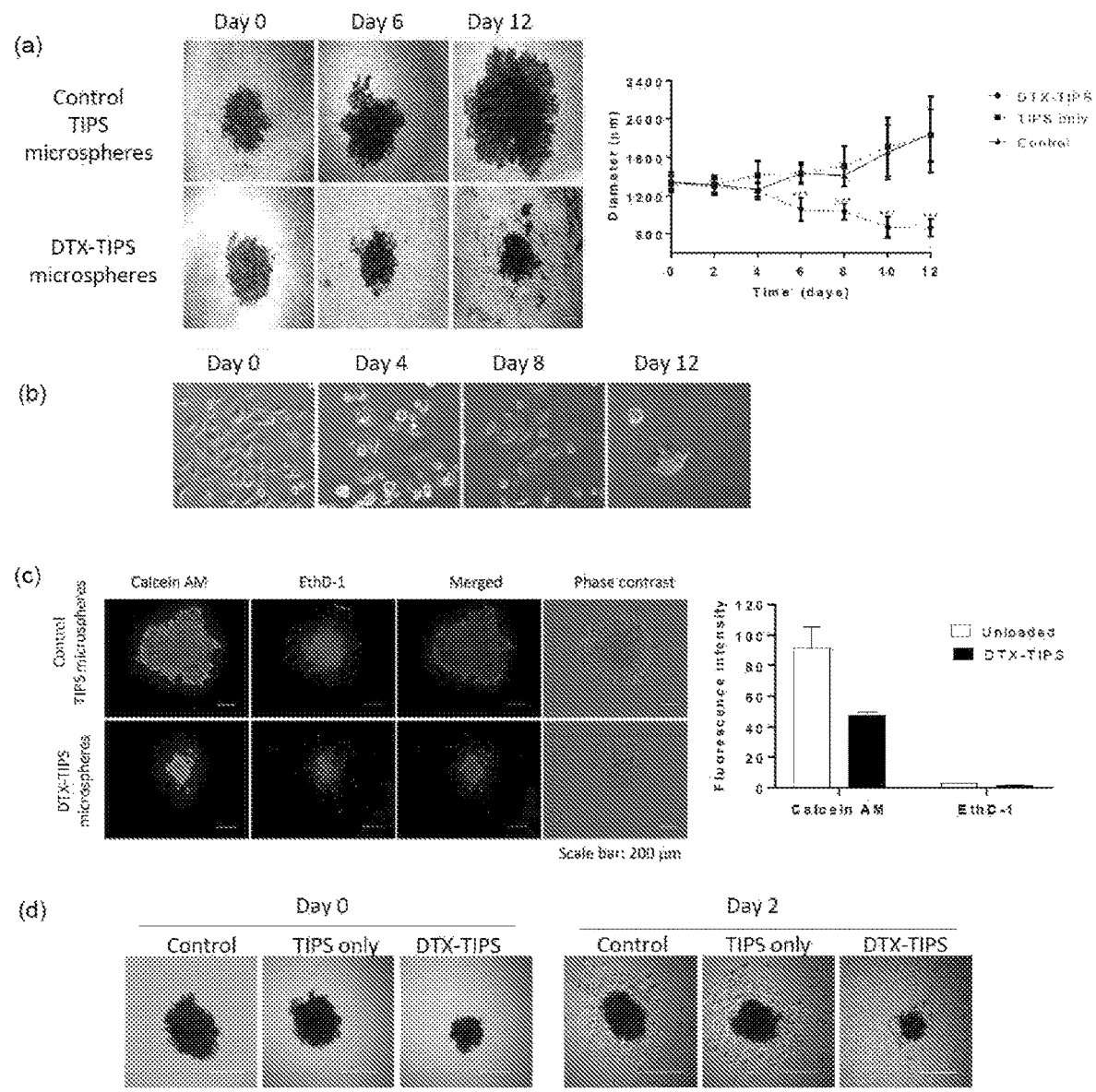

FIG. 10 shows (a) 3D spheroid cultures of PC3 cells were incubated in perfusate collected from DTX-TIPS or unloaded control TIPS microspheres for 12 days. The culture medium was replaced with perfusate collected at the corresponding time points. The diameter and volume of the spheroids was calculated from images acquired throughout the incubation period. Spheroids incubated with perfusate from DTX-TIPS shrank in size over time. (b) PC3 cells cultured in 2D in tissue culture wells were treated in the same manner and exhibited morphological features of cytotoxicity. (c) The viability of cells in the spheroids incubated with perfusate at day 12 was analysed using Live/Dead® staining (calcein AM—live cells and ethidium homodimer-1 (EthD-1.) dead cells) Scale bars 200 μm. (d) PC3 cells in spheroids incubated with perfusate from DTX-TIPS microspheres and transferred to tissue culture plates at day 12 failed to migrate from the spheroid and appeared non-viable, whereas cells from spheroids incubated with control microspheres were viable and migrated from the spheroid. (Scale bar 200 µm. Data represents mean±standard deviation from n=20. *** p<0.001 between control and DTX treated samples.)

Figure 11:
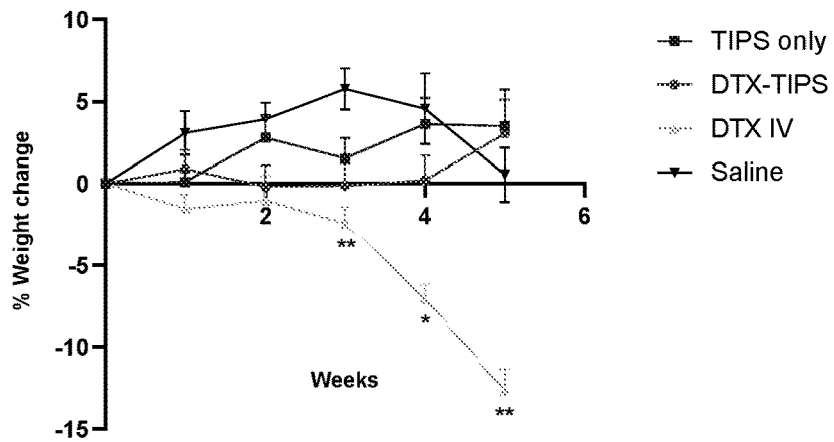
Figure 11:
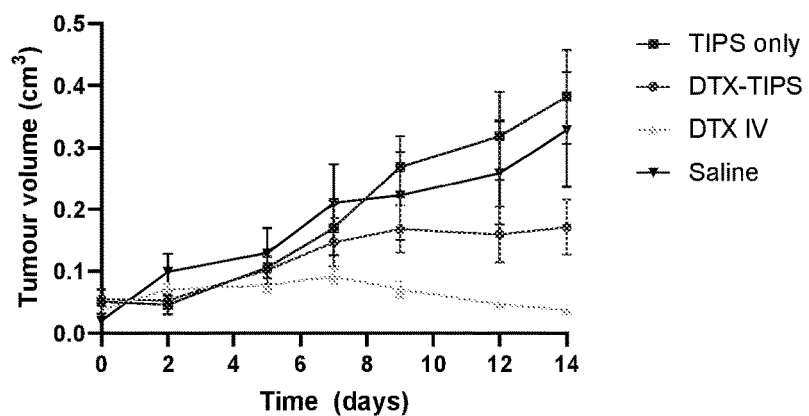
Figure 11:
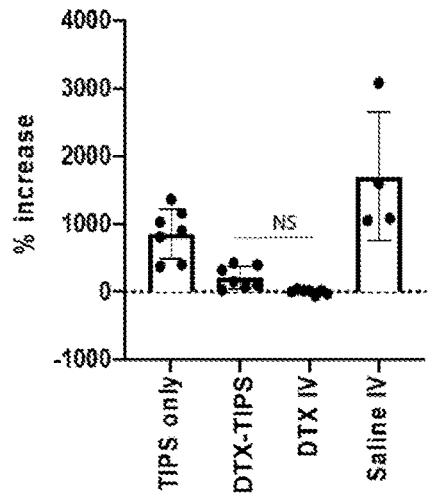

FIG. 11 shows that DTX-TIPS inhibits tumour growth in vivo without systemic toxicity. (a) Mice receiving IV DTX exhibited progressive significant weight loss indicating systemic toxicity. (b) The volume of the tumours steadily increased over the study period in mice receiving control TIPS microspheres or IV saline. (c) In mice receiving IV DTX at day 14 there was no significant difference in tumour size increase between mice receiving DTX IV and DTX-TIPS, indicating DTX-TIPS is equally effective in preventing tumour growth.

Figure 12:
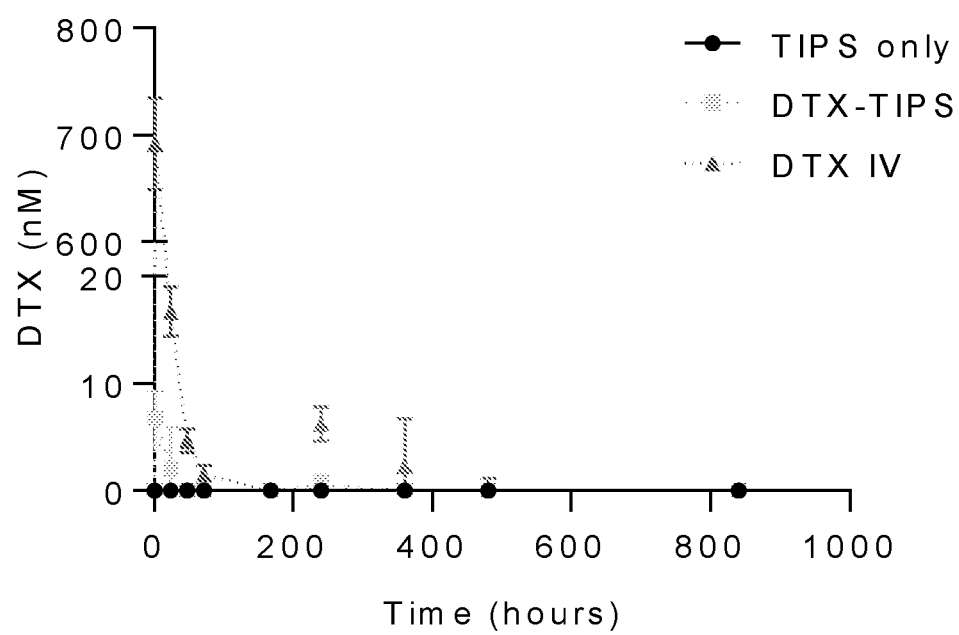

FIG. 12 shows measurement of DTX in plasma collected from non-tumour bearing BALB/cAnNCrl mice. Low levels of DTX were detectable in plasma only at 1 hour and 24 hours after delivery of DTX-TIPS microspheres. Higher levels of DTX at 1 hour and 24 hours were detected following I.V. DTX administration, with detectable levels of DTX remaining at 48 hours and 72 hours and also at day 10 (240 hours) and day 15 (360 hours).

Figure 13:
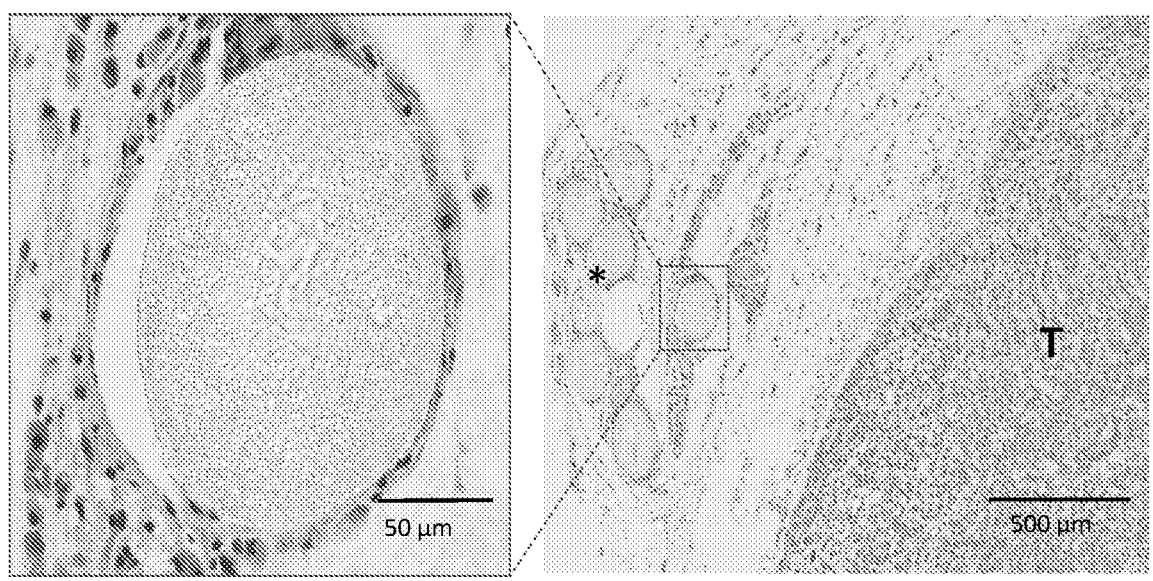

FIG. 13 shows the histology of a resected PC3 xenograft tumour (T). The DTX-TIPS microspheres implanted peritumourally (*) remain at the site of delivery at day 35. The microspheres are surrounded by loose connective tissue. Higher magnification (inset) reveals the microspheres remain intact following implantation.

Figure 14:
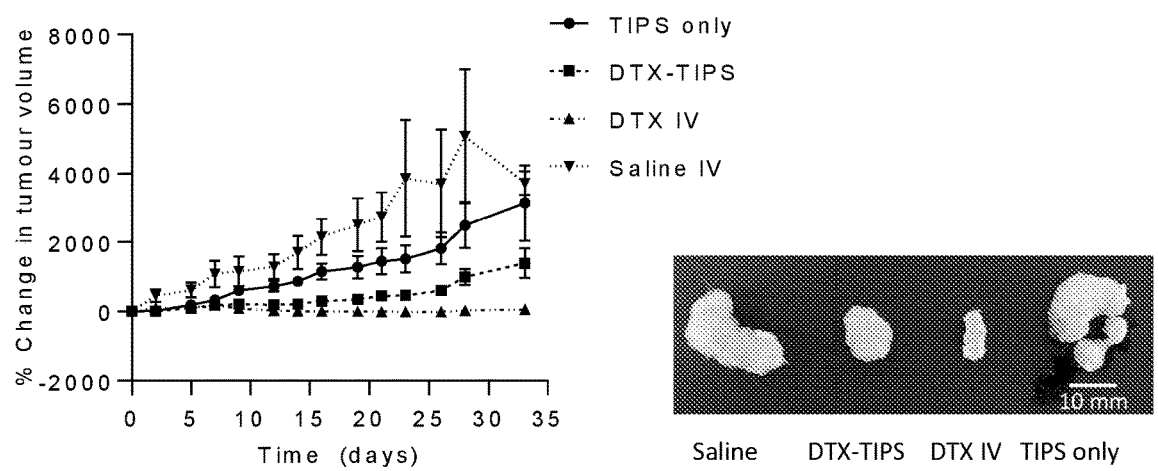
Figure 14:
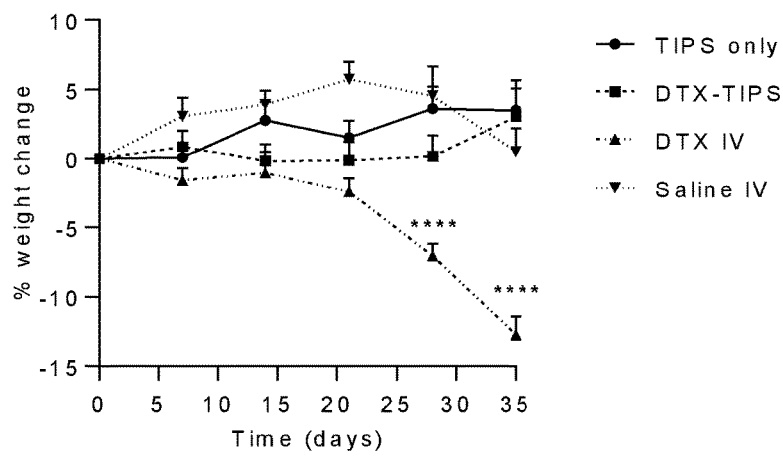

FIG. 14 shows (a) The greatest increase in tumour volume was observed in the groups receiving either I.V. saline or control TIPS microspheres. No increase in tumour volume was observed in the group receiving I.V. DTX. Tumour volume increase was attenuated in the group receiving DTX-TIPS. (b) Macroscopic images of representative resected PC3 prostate cancer xenografted tumours illustrating the difference in tumour volume associated with the different treatment groups. (c) Change in body weight of NSG™ immunodeficient mice following treatment. Progressive weight loss was observed in mice receiving I.V. DTX. No significant different weight change was observed in mice receiving DTX-TIPS. (****p<0.0001).

EXAMPLES

Example 1

Materials and Methods
Fabrication of TIPS Microspheres

TIPS microspheres composed of poly(D, L-lactide-co-glycolide) (PLGA) were prepared as previously described (Ahmadi R, Mordan N, Forbes A, Day RM. Enhanced attachment, growth and migration of smooth muscle cells on microcarriers produced using thermally induced phase separation. Acta Biomater. 2011 April; 7(4):1542-1549). PLGA PURASORB 7507 (75:25) polymer (Corbion, Amsterdam, Netherlands) was dissolved in dimethyl carbonate (Sigma Aldrich, Dorset, UK) overnight using magnetic stirring to produce a 10% (w/v) polymer solution. The polymer solution then was fed into a Nisco Encapsulator Unit (Nisco Engineering, Zurich, Switzerland; Frequency: 2.75 kHz, Amplitude: 70%) by a syringe pump (Harvard Apparatus, Kent, UK), at a constant flow rate of 2 mL/min. The polymer droplets were formed using a 100 µm sapphire nozzle and collected in liquid nitrogen. Residual solvent was removed from the frozen polymer droplets by lyophilisation for 48 hours. The dried PLGA TIPS microspheres were sieved to a size range of 250-350 µm and stored at room temperature in rubber stoppered glass vials under vacuum.

Loading of Taxanes with TIPS Microspheres

Figure 1:
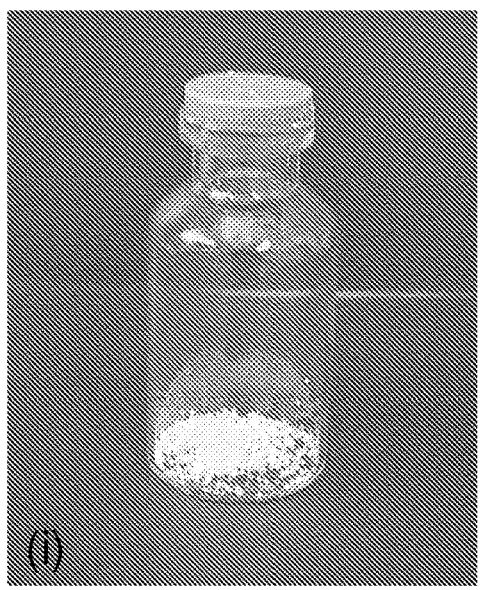
Figure 1:
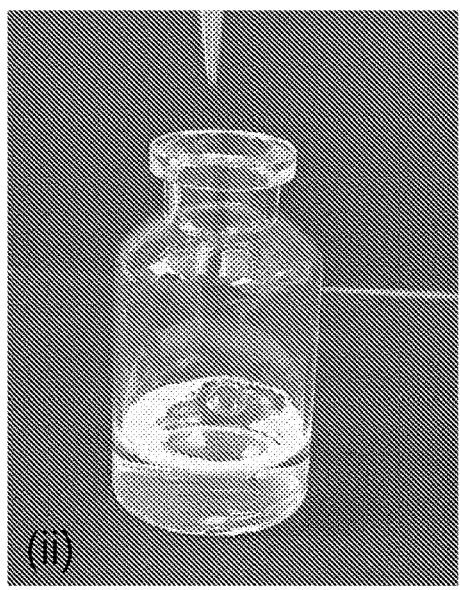
Figure 1:
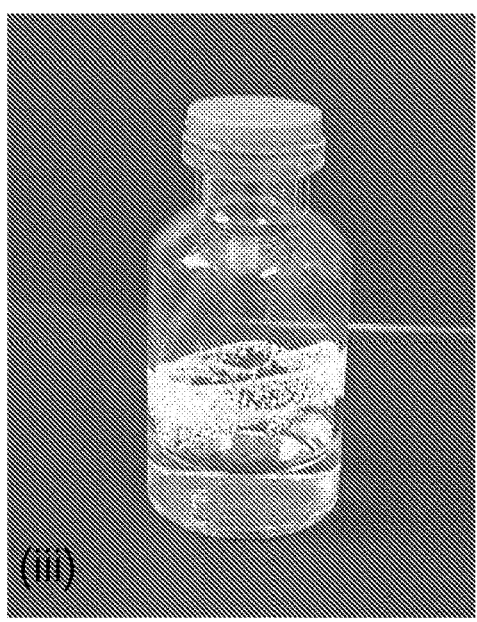
Figure 1:
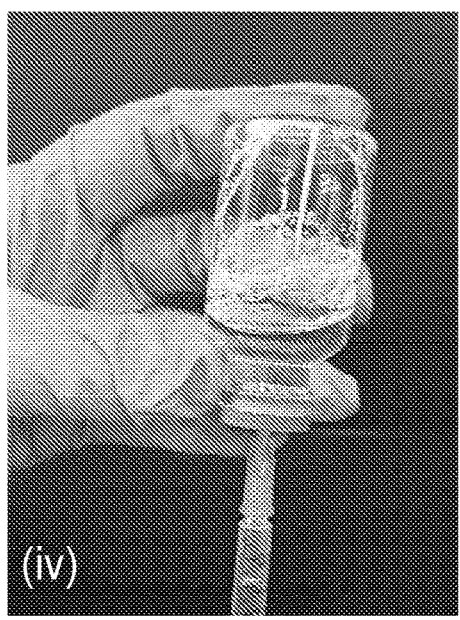
Figure 1:
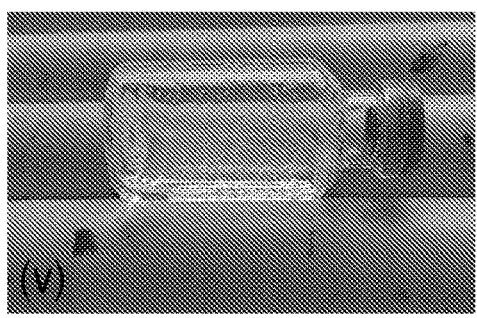

A facile method was developed to load DTX and other taxanes such as paclitaxel and cabazitaxel onto TIPS microspheres via antisolvent precipitation (FIG. 1). 5 mg of PLGA TIPS microspheres were transferred into 20 ml clear Type 1B boroscilicate glass vials and sealed with a butyl injection stopper. 4.5 mL of ultrapure water was added to the vial and vortexed for 10 seconds. 0.5 ml of 0.1% (w/v) taxane in ethanol, or a formulation of docetaxel or paclitaxel matching Taxotere® or Taxol® was added using a 1 mL syringe with a 25G needle through the rubber stopper, when the vial was inverted. The vial was then vortexed for 10 seconds and placed on a roller mixer (IKA® Roller 6 Digital; 60 rpm) at room temperature for predetermined periods (5, 15, 30, 60, 120 minutes).

Drug loading efficiency (DLE) of the taxane, such as DTX, onto the TIPS microspheres at each time-point was calculated according to Equation 1. The amount of free taxane left in the solution was measured by UV spectroscopy at the wavelength of 229 nm using a Nanodrop 2000c spectrophotometer (Thermo Scientific, Waltham, MA, USA).

$$DLE\ (\%) = \frac{\text{Total } DTX \text{ added} - \text{Free } DTX}{\text{Total } DTX \text{ added}} \times 100\% \quad \text{Equation 1}$$

Scanning electron microscopy was used to investigate the morphological changes on the surface of TIPS microspheres upon the loading of the taxane. Unbound taxane was removed from the microspheres by washing thrice with 5 ml ultrapure water, followed by desiccation under vacuum. Samples of the dried particles were coated with gold for 60 seconds using a Q150R ES gold coater (Quorum Technologies, Oxford, UK). The samples were imaged using a Hitachi 53400N scanning electron microscope.

X-ray photoelectron spectroscopy (XPS) was performed using a Thermo Scientific K-alpha photoelectron spectrometer using monochromatic Alkaradiation. Higher resolution scans were recorded for the principal peaks of N(1s), C(1s) at a pass energy of 50 eV.

Comparison of Methods Used to Load API onto PLGA TIPS Microspheres

1. Dry TIPS PLGA microspheres (size range of 250-350 µm): Docetaxel loaded onto 5 mg PLGA TIPS microspheres as described directly above. Dry loaded TIPS microspheres were prepared by either placing washed microspheres in a dessicator for at least 7 days or removing excess water by lyophilisation ('freeze dried').

2. 'Pre-wetted' TIPS PLGA microspheres: 5 mg PLGA TIPS microspheres mixed with complete culture medium (Ham's F12-K medium (Kaighn's modification) (Invitrogen, 21127-022) supplemented with 10% (v/v) foetal bovine serum (FBS) and 1% antibiotics), with ethanol subsequently added to a concentration of 7% (v/v).

3. An equivalent number of solid PLGA microspheres (size range of 250-350 µm) to the quantity of microspheres in 5 mg of dry TIPS PLGA microspheres were transferred into 20 ml clear Type 1B boroscilicate glass vials and sealed with a butyl injection stopper. 4.5 mL of ultrapure water was added to the vial and vortexed for 10 seconds. 0.5 ml of 0.1% (w/v) docetaxel in ethanol was added using a 1 mL syringe with a 25G needle through the rubber stopper, when the vial was inverted. The vial was then vortexed for 10 seconds and placed on a roller mixer (IKA® Roller 6 Digital; 60 rpm) at room temperature for predetermined periods (5, 15, 30, 60, 120 minutes).

4. Drug loading efficiency (DLE) of docetaxel (DTX) onto the TIPS microspheres at each time-point was calculated according to Equation 1. The amount of free docetaxel left in the solution was measured by UV spectroscopy at the wavelength of 229 nm using a Nanodrop 2000c spectrophotometer (Thermo Scientific, Waltham, MA, USA).

Docetaxel Release from the DTX-TIPS Microspheres Combination Product

Release profile of DTX from the TIPS microspheres was investigated using a dynamic perfusion system to simulate tissue perfusion of the drug-device combination in the physiological milieu when used in clinic following radical prostatectomy. Thus, the perfusion system was placed inside an incubator at 37° C. and physiological simulated medium (phosphate buffed saline (PBS); pH 7.4) was used as perfusate. DTX-loaded microspheres were mixed with 100 µl of 70% (v/v) GranuGel® (Convatec, UK) diluted in ultrapure water and the mixture was placed between two 25 mm circular filter papers (Whatman® qualitative cellulose filter paper, Grade 1), where their positions were held by a Swin-Lok™ plastic membrane filter holder. A hypodermic needle (18G×40 mm) connecting the outlet of the filter holder, was inserted through the lid of a 50 ml polypropylene container to collect the perfusate. PBS was pumped through the filter holder by a peristaltic pump (Harvard Apparatus) at a flow rate of 0.01 mL/min. The conditioned perfusate was sampled at the specified intervals and used for further experiments.

The amount of DTX released in the perfusate was determined using a predetermined standard curve. At each measurement, the concentration of DTX in the release medium collected in the polypropylene container was determined by UV spectroscopy at 229 nm as described above, to calculate the cumulative DTX release according to Equation 2.

$$\text{Cumulative release (\%)} = \frac{\text{Concentration of } DTX \text{ in perfusate} \times \text{total volume of perfusate}}{\text{Total } DTX \text{ loaded on the } TIPS} \times 100\% \quad \text{Equation 2}$$

In Vitro Efficacy of Docetaxel Released from the DTX-TIPS Microspheres Combination Product Human prostate cancer cells (PC3, American Type Culture Collection) were used to test the activity of the docetaxel released from the DTX-TIPS microspheres. PC3 cells were maintained in Ham's F12-K medium (Kaighn's modification) (Invitrogen, 21127-022) supplemented with 10% (v/v) foetal bovine serum (FBS) and 1% antibiotics (referred to henceforth as complete medium). Cells were cultured at 37° C. under 5% $CO_2$ atmosphere in a humidified incubator.

PC3 cells cultured in 6 well plates were incubated for 48 hours in 2 ml of perfusate (conditioned complete culture medium) collected from DTX-TIPS microspheres loaded into the perfusion system, as outlined above. Colony formation assays were performed as previously described (Franken NAP, Rodermond HM, Stap J, Haveman J, van Bree C. Clonogenic assay of cells in vitro. Nat Protoc. 2006; 1(5):2315-2319). The PC3 cells exposed to the perfusate were detached from the 6 well plates using trypsin-EDTA solution ((0.5 g/l porcine trypsin and 0.2 g/l EDTA·4Na in Hank's Balanced Salt Solution with phenol red; Sigma-Aldrich), washed in fresh complete medium to produce a single cell suspension, resuspended in fresh complete medium and re-plated into 9 cm diameter petri dishes at a density of 400 cells per dish. After plating the dishes were incubated at 37° C. under 5% $CO_2$ atmosphere in a humidified incubator for 2 weeks to allow formation of colonies. The colonies were fixed with methanol for 20 min and stained with 0.5% crystal violet (Sigma Aldrich, Dorset, UK) in distilled water for 2 hours. The colonies were counted in ImageJ using the 'Colony Counter' plug in (processing parameters: size 100-30,000; circularity 0.5-1) (https://imagej.nih.gov/ij/plugins/colony-counter.html).

Plating efficiency (PE) was estimated by dividing the number of colonies counted by the number of cells initially seeded. This number was used for normalisation in calculating the surviving fraction (SF).

$$SF = \frac{\text{number of colonies formed after treatment}}{\text{number of cells seeded} \times PE}$$

Morphological Detection of Apoptosis in 2D Culture

Morphological changes to PC3 cells indicative of apoptosis, including shrinkage and fragmentation into membrane-bound apoptotic bodies, was assessed following exposure to perfusate conditioned complete medium. Cells were incubated for 24 hours in the perfusate conditioned complete medium collected over 12 days at 24-hour intervals. Images of cell morphology were acquired using phase contrast microscopy using a Zeiss Primovert microscope and at least 100 cells in each group were analysed to calculate the number of cells in each image displaying nuclear fragmentation.

Efficacy Studies with Tumour Spheroids 3D spheroids of PC3 cells were generated by using methylcellulose as a scaffold, as previously described (Korff T. (2004) Three-Dimensional Spheroid Culture of Endothelial Cells. In: Augustin H. G. (eds) Methods in Endothelial Cell Biology. Springer Lab Manuals. Springer, Berlin, Heidelberg). PC3 were seeded at a concentration of $2 \times 10^4$ cells/200 µL complete culture medium containing 20% wt methylcellulose in 96-well ultralow attachment u-bottom plates. The cells were incubated for 2 days at 37° C. under 5% $CO_2$ atmosphere in a humidified incubator until the spheroids had formed. The medium was replaced with 200 µL perfusate conditioned complete medium that was replaced daily with medium collected from the perfusate system at the corresponding time-point over 12 or 14 days.

Images of the spheroids were acquired for each day of the culture. The dimensions of the imaged spheroids were measured using Image J. Feret's diameter was used to estimate the mean diameter of spheroids and plotted against time (GraphPad Prism software).

Prostate Tumour Formation In Vivo

Five million human prostate cancer cells (PC3, American Type Culture Collection) were injected subcutaneously into the flank of female NSG™ (NOD scid gamma) immunodeficient mice (age 6-7 weeks). After 2 weeks palpable tumours measuring ~20 mm 3 had formed. The size of each tumour and the weight of each animal were recorded 3 time per week.

Tumour Treatment

The mice were allocated to one of four treatment groups (DTX-TIPS microspheres n=7; Control TIPS microspheres n=7; native DTX n=7; saline n=4) and received the following treatment regimens:

1. Peri-tumoural delivery of DTX-TIPS microspheres: 5 mg PLGA TIPS microspheres loaded with 500 µg DTX solution (as described in Example 1) mixed into 100 µl GranuGel.
2. Peri-tumoural delivery of control TIPS microspheres: 5 mg PLGA TIPS microspheres mixed into 100 µl GranuGel.
3. Tail vein injection of 10 mg DTX dissolved in ethanol and Tween 80 to produce 10 mg/ml solution followed dilution in saline to 1 mg/ml. The mice received 10 mg/kg; once per week for 3 weeks.
4. Tail vein injection of saline (10 Wig); once per week for 3 weeks.

At the end of the in life phase, the animals were humanely culled. The tumours were resected and weighed prior to histological analysis.

Measurement of DTX Released In Vivo from the DTX-TIPS Microspheres

Docetaxel-loaded TIPS microspheres were prepared via anti-solvent precipitation, as outlined above. To determine the concentrations of DTX present in the circulation post-treatment, DTX-TIPS microspheres were mixed into a uniform suspension in 100 µl of 70% (v/v) GranuGel and implanted subcutaneously via 1×100 µl depot using a 1 mL syringe and 16G needle into non-tumour bearing BALB/cAnNCrl mice (n=5) (7-8 weeks, 17-20 g, Charles River). Control animals received either control TIPS microspheres (n=5) or I.V. DTX 10 mg/kg via tail vein delivery once weekly for three weeks (n=5). For measurement of circulating DTX in plasma, blood samples were collected via the tail vein at day 0 (pre-dose), and days 1, 2, 3, 7, 10 then every 5 days until day 35 immediately before the end of in life phase. Blood samples were collected into 10 µl capillaries containing sodium heparin (Hirschmann, Eberstadt, Germany) and placed in wells of a 2 ml deep well plate that was stored at −80° C. until extraction.

On the day of the extraction, calibration curve and sample plates were thawed. 125 µl of water:acetonitrile containing 0.4% blood was added to blanks, calibration curve and QCs. 125 µl of 70:30 water:acetonitrile containing 0.4% DMSO was added to all samples. 40 µl of each blood:water:acetonitrile sample was taken and protein precipitated with 120 µl acetonitrile containing DTX-D9 (25 nM). Samples were mixed and centrifuged. Supernatant was taken and diluted 40:60 with 0.5% sodium acetate (20 µM) in ammonium acetate (10 mM, pH5).

Liquid chromatography-mass spectrometry analysis was carried out with a Waters (Milford, MA) H-class Acquity solvent manager and sample manager on a Waters Acquity HSS PFP column (1.8 µm, 50 mm×2.1 mm id) with a gradient consisting of 10 mM ammonium acetate (pH 5.0) and acetonitrile mobile phases. The flow rate was 0.6 ml/min and the run time 5.6 minutes. Analyte and internal standard were ionised using electrospray ionisation in positive ion mode. Detection of analytes was via tandem mass spectrometry (MS/MS) using a Waters Xevo TQ-S mass spectrometer in the multiple reaction monitoring (MRM) mode. For DTX and DTX-D9 (IS), the transitions m/z 830.4-248.1/304.2 and m/z 839.4-313.0 were monitored respectively. The calibration curve was linear over the concentration range 1-nM.

In Vivo Tumour Growth Inhibitory Activity

Female NSG™ immunodeficient mice (NOD.Cg-PrkdscidIl2rgtm1Wjl/SzJ; Charles River), aged 6-7 weeks and 18-20 g in body weight, were acclimatised for 1 week prior to injection of tumour cells. PC3 cells ($5.0×10^6$ cells in 100 µl phosphate buffered saline [PBS]) were injected subcutaneously into the right flank of each mouse. The dimensions of tumour were measured three times per week using digital callipers and the tumour volume calculated using the following formula:

$$\text{Tumour volume } (\text{cm}^3) = (W/10 \times L/10 \times H/10) \times \frac{\pi}{6}$$

At day 14 post-cell injection, the mice were randomised into four groups: Group 1 intravenous (I.V.) DTX (10 mg/kg via tail vein delivery once weekly for three weeks; n=7); Group 2 peri-tumoural injection of DTX-TIPS microspheres (n=7); Group 3 peri-tumoural injection of control TIPS microspheres (n=7); Group 4 I.V. saline (10 Wig body weight; n=4). Mice in Groups 2 and 3 received TIPS microspheres (+/−DTX) after mixing the microspheres into a uniform suspension in 100 µl of 70% (v/v) GranuGel. The suspension of TIPS microspheres in GranuGel was delivered subcutaneously via 1×100 µl depot using a 1 mL syringe and 16G needle around the periphery of the tumour. Mice were monitored for signs of toxicity (weight loss, body condition and uncoordinated movement) over the duration of the study. Mice were euthanised if weight loss exceeded 15% of the starting body weight or they showed excessive signs of toxicity.

At the end of the in-life phase (day 1, 10 and 35 post-treatment) the mice were euthanised by overdose of $CO_2$, followed by cervical dislocation and organs (heart, liver, kidneys, lungs and spleen) were collected, weighed and immediately frozen in liquid nitrogen before storage at −80° C. until further analysis. Evaluation of docetaxel concentrations was carried out by liquid chromatography tandem mass spectrometry in tissue following homogenisation in 3 ml/g (spleens 5 ml/g) 10 mM PBS using a Precellys 24 homogeniser (Bertin technologies, Montigny-le-Bretonneux, France). 45 µl tissue homogenate was spiked with 5 µl DMSO, samples were mixed and protein precipitated with 150 µl acetonitrile containing DTX-D9 as internal standard (25 nM). Samples were mixed and centrifuged. Supernatant was taken and diluted 40:60 with 0.5% sodium acetate (20 µM) in ammonium acetate (10 mM, pH 5). Blanks, calibration curve and QCs were prepared as above using tissues obtained from the same strain of mice (NSG) and spiked with DMSO, working calibration standard and working QC respectively. Blanks consisted of protein precipitated with acetonitrile alone, blank+, standards and QCs were protein precipitated with acetonitrile containing DTX-D9.

The tumours were explanted and processed for histology. Tissues were fixed in 10% formalin, dehydrated and embedded in low-melting point wax (Paraplast X-TRA®, Sigma). Tissue sections cut from the wax-embedded tissue were stained with haematoxylin and eosin.

Statistical Methods

Data were tested for Gaussian distribution and analysed for statistical significance using GraphPad Prism software. For data sets with a Gaussian distribution statistical evaluation was performed by Two-Way ANOVA with Dunnett's test for multiple comparisons unless stated otherwise in the figure legend. For data sets with a non-Gaussian distribution statistical evaluation was performed by the Friedman test.

Example 2

Immobilisation of DTX onto PLGA TIPS Microspheres

Figure 2:
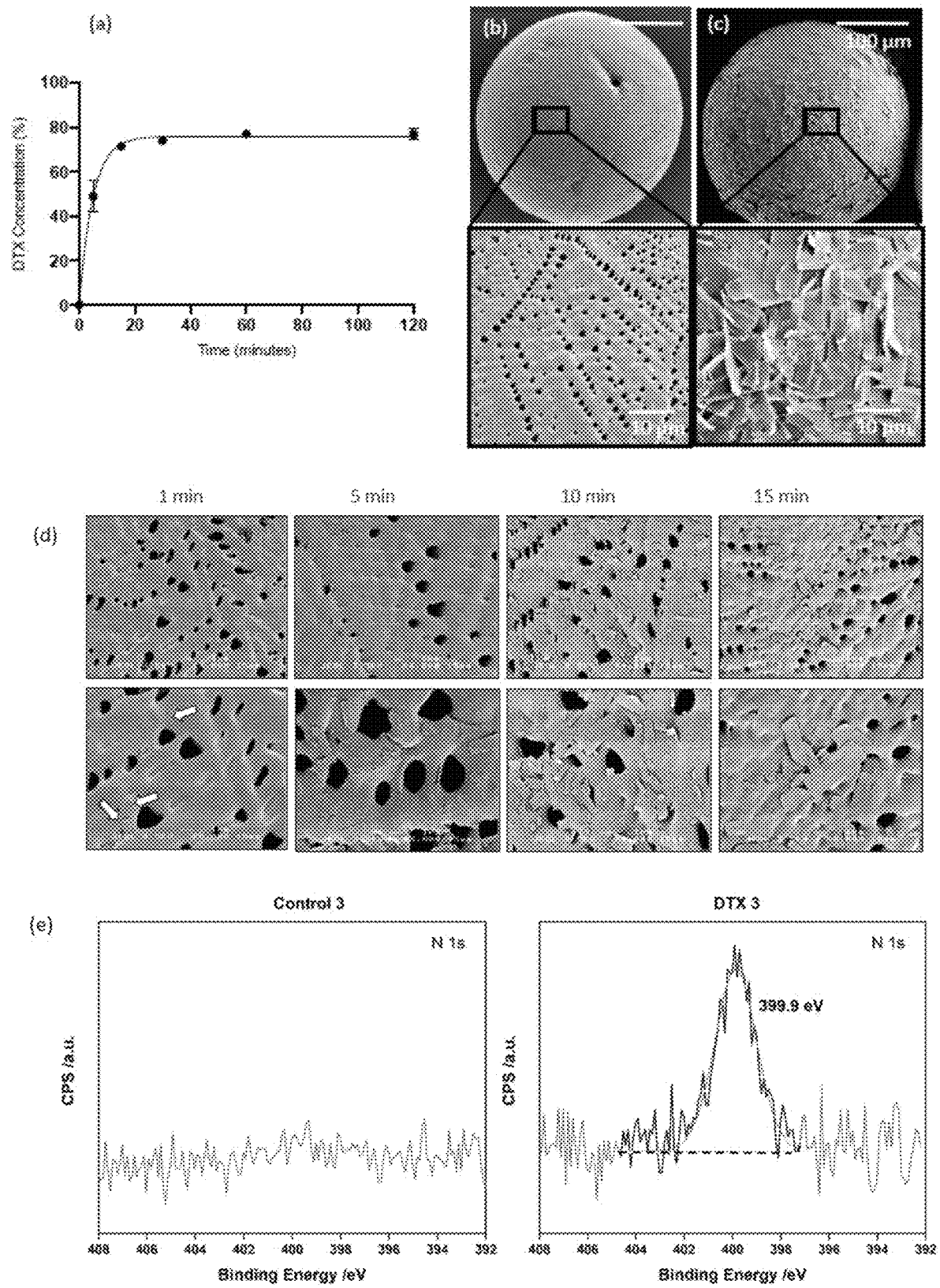
Figure 2:
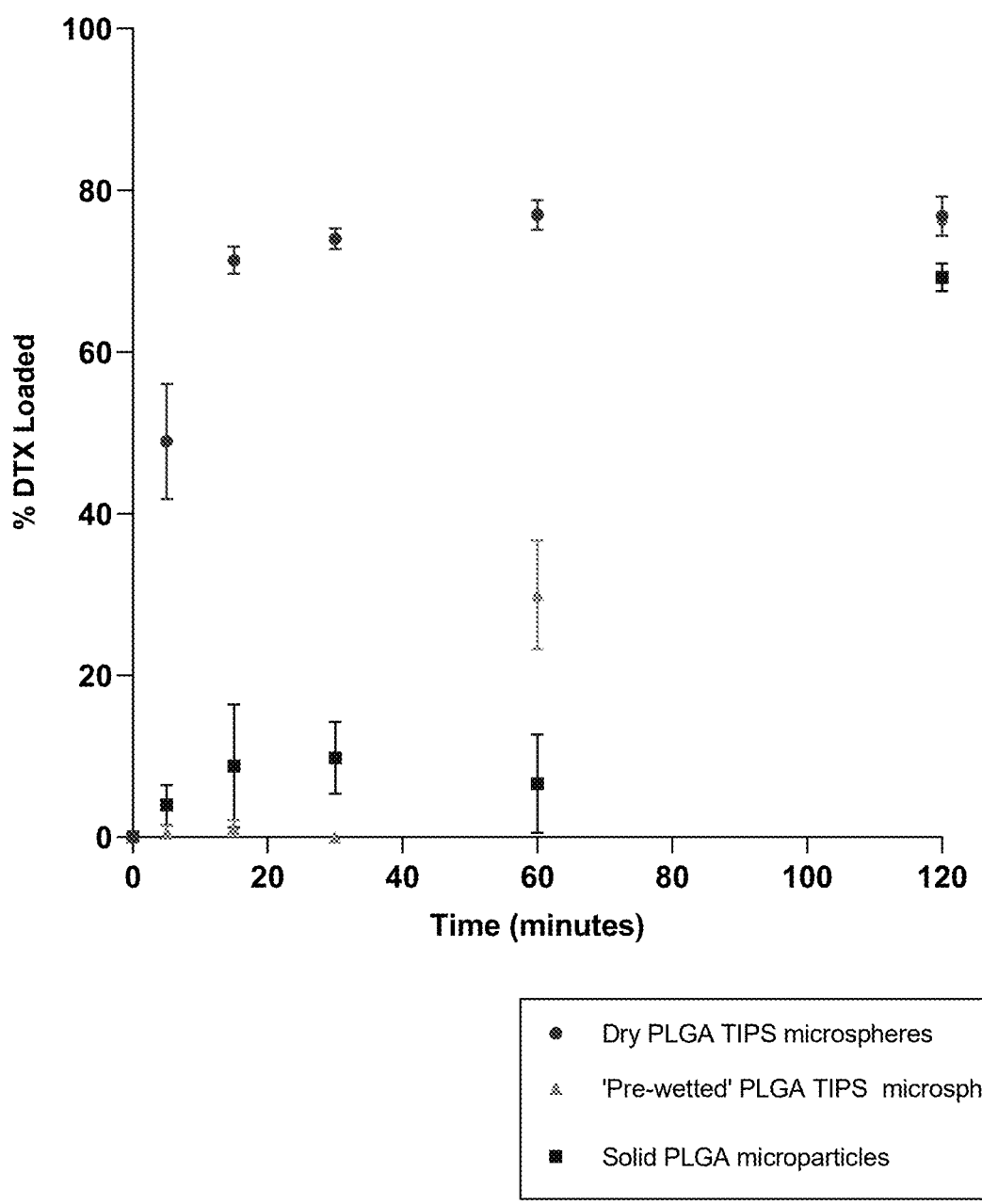
Figure 2:
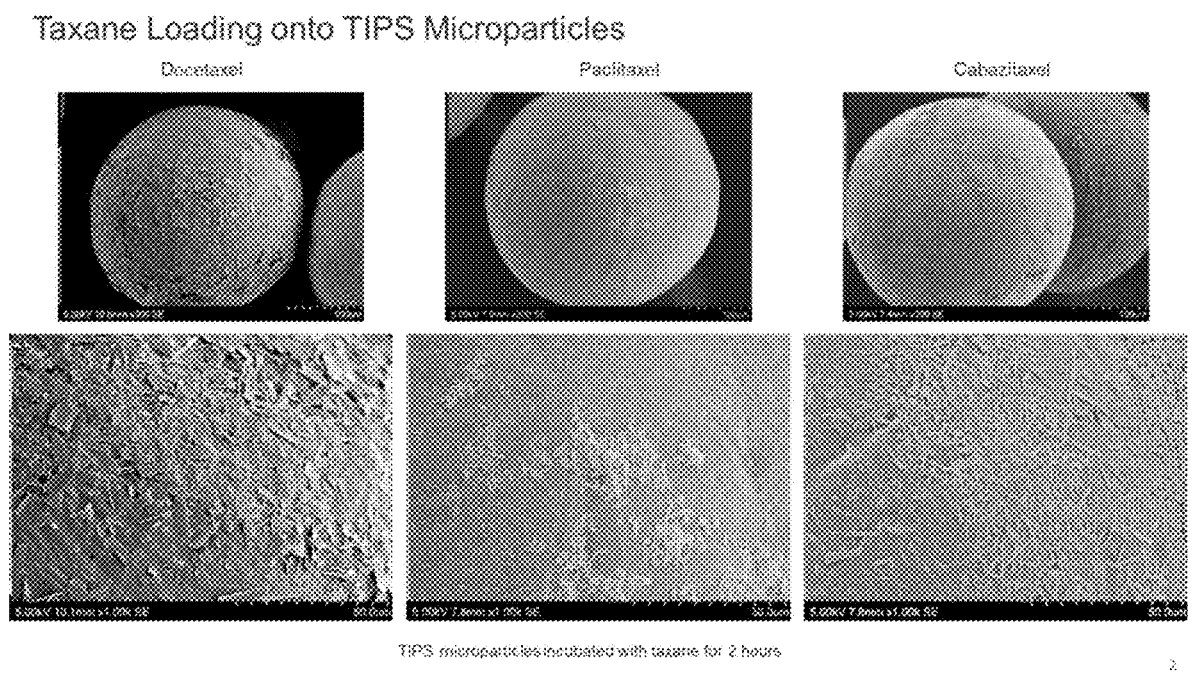
Figure 2:
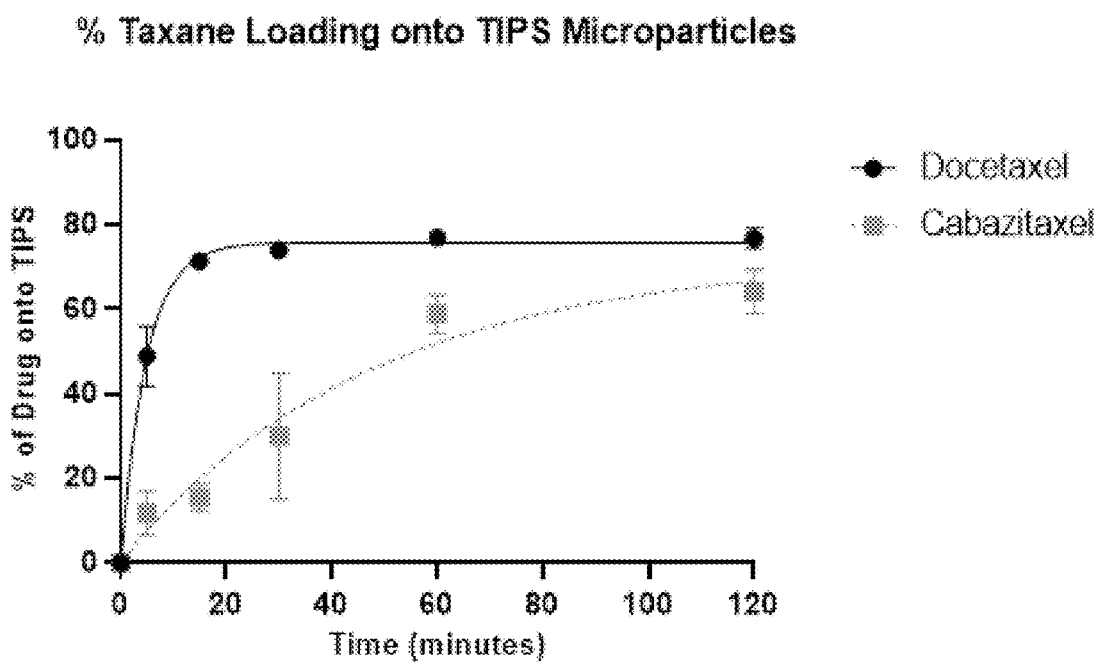

The second composition of the PLGA TIPS microspheres initially floated at the top of the DTX solution but were constantly mixed with solution by rotation of the glass vial during the loading phase. The amount of DTX loaded onto the microspheres was indirectly quantified by calculating the amount of DTX remaining in solution at different time points during the loading phase. Approximately 80% of the DTX was loaded onto the microspheres from the solution within 60 minutes of initiating mixing (FIG. 2a). No further increase in loading was detected beyond 60 minutes during the loading phase. Rapid loading of the TIPS microspheres within an hour is likely enhanced by their unusually high surface electrostatic charge. Such rapid loading is beneficial when using biodegradable devices. Scanning electron microscopy of the microspheres revealed the presence of crystalline material on the surface of the microspheres incubated in the DTX solution compared with unloaded control TIPS microspheres (FIGS. 2b & c). The crystalline material was visible on the surface of the microspheres within 1 minute of incubation and progressively increased with duration of incubation time (FIG. 2d). The molecular composition of DTX ($C_{43}H_{53}NO_{14}$) allowed for X-ray photoelectron spectroscopy (XPS) analysis for nitrogen to be used to confirm the elemental composition of the crystalline material on the surface of the microspheres (FIG. 2e). A strong nitrogen signal was detected on the DTX-loaded microspheres that was absent in the unloaded control microspheres. Significantly faster rate of drug loading is achieved with dry PLGA TIPS microspheres compared with solid microspheres composed of identical PLGA polymer or PLGA TIPS microspheres loaded after 'pre-wetting' TIPS microspheres (See Comparison of Methods Used to Load API onto PLGA TIPS Microspheres in Example 1 above where microspheres were submerged in culture medium prior to the addition of ethanol) (FIG. 2f).

Scanning electron microscopy of TIPS microspheres also revealed the presence of crystalline material on the surface of TIPS microspheres incubated in the paclitaxel or cabazitaxel solution compared with unloaded control TIPS microspheres (FIG. 2g).

The presence of taxane crystals on the surface of the TIPS microspheres indicates that taxane was loaded on the surface instead of by entrapment in the particles. Taxane crystals observed on the TIPS particles were likely formed by anti-solvent precipitation and grew during the drying process as a result of solvent evaporation. The hydrophobic and porous nature of the PLGA TIPS microspheres provided a suitable surface for taxane precipitation as it facilitated nucleation of drug and thus promoted crystallisation on the surface, accounting for the high drug loading efficiency of ~80%. The maximum loading of DTX onto the TIPS particles occurred within 60 minutes without the utilisation of heating and cooling steps, making it a feasible time-frame for preparing the drug-device combination at the point of care. It was however noted that the rate of anti-solvent precipitation loading of TIPS microspheres differs with different taxanes.

Docetaxel showed a faster rate of loading onto TIPS microspheres compared with cabazitaxel. Approximately 80% of the docetaxel was loaded onto the microspheres from the solution within 60 minutes of initiating mixing (FIG. 2h). At the same time-point, about 60% of cabazitaxel was loaded onto the microspheres from the solution. No further increase in docetaxel loading was detected beyond 60 minutes during the loading phase.

Example 3

Excipients in Injection Formulations of Taxanes Impedes Anti-Solvent Precipitation Drug Loading onto TIPS Microspheres Docetaxel for injection (e.g. Taxotere®) is formulated in a vehicle composed of 1:1 blend of Tween 80 and ethanol which is diluted further in saline before administration. Paclitaxel for injection (e.g. Taxol®) is formulated in a vehicle composed of 1:1 blend of Cremophor EL and ethanol which is diluted 5-20 fold in saline before administration. The use of injection formulations of taxanes containing excipients is not compatible with the loading of taxanes onto TIPS microspheres.

Figure 3:
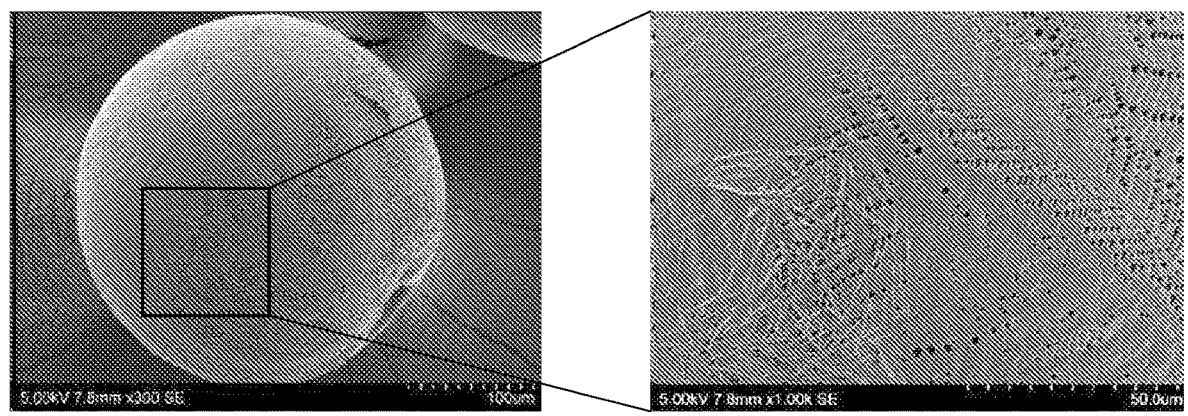

Scanning electron microscopy of the microspheres revealed the presence of less crystalline material on the surface of the microspheres incubated in the injection formulation of docetaxel and paclitaxel compared with TIPS microspheres incubated with the pure formulation of docetaxel and paclitaxel without the addition of excipients (FIG. 3).

Figure 4:
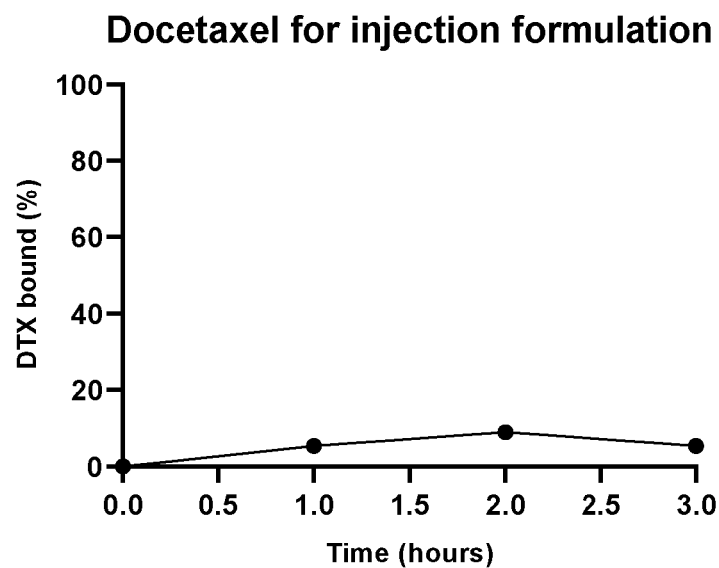
Figure 4:
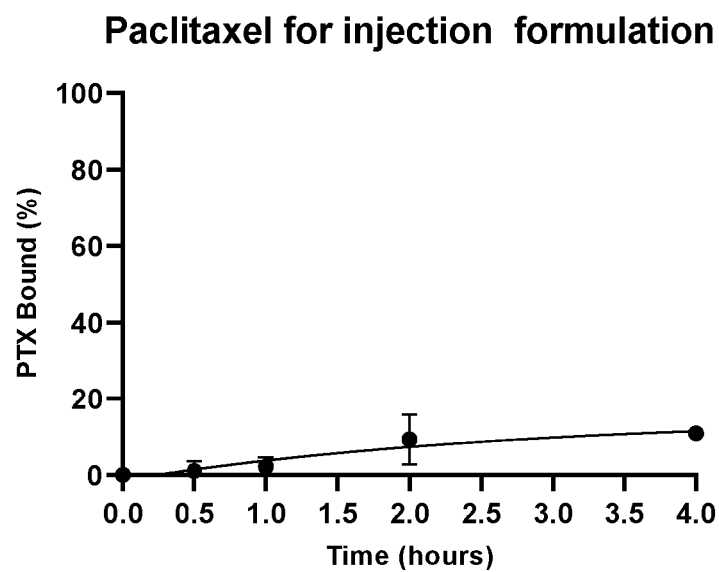

The formulation of docetaxel or paclitaxel matching Taxotere® or Taxol® showed much less drug loading onto the microspheres compared with the pure formulation of docetaxel and paclitaxel without the addition of excipients (FIG. 4). Approximately <10% of docetaxel was loaded onto the microspheres from the solution after 3 hrs of initiating mixing. Approximately <10% of paclitaxel was loaded onto the microspheres from the solution after 4 hrs of initiating mixing.

Example 4

Lyophilization of TIPS Microspheres Loaded with Drug Via Anti-Solvent Precipitation does not Affect Taxane Release from TIPS Microspheres Following anti-solvent precipitation loading of drug onto TIPS microspheres, the microspheres can be used immediately after the final washing stage ('wet') or subsequently undergo drying to enable long-term dry storage of the microspheres. Dry storage is important since the microspheres are composed of PLGA, a polymer that undergoes hydrolytic degradation when exposed to water. Therefore, any residual water present in the stored finished product will result in the microspheres degrading. This will result in a loss of microsphere structure and release of the drug loaded onto the microsphere surface.

Figure 5:
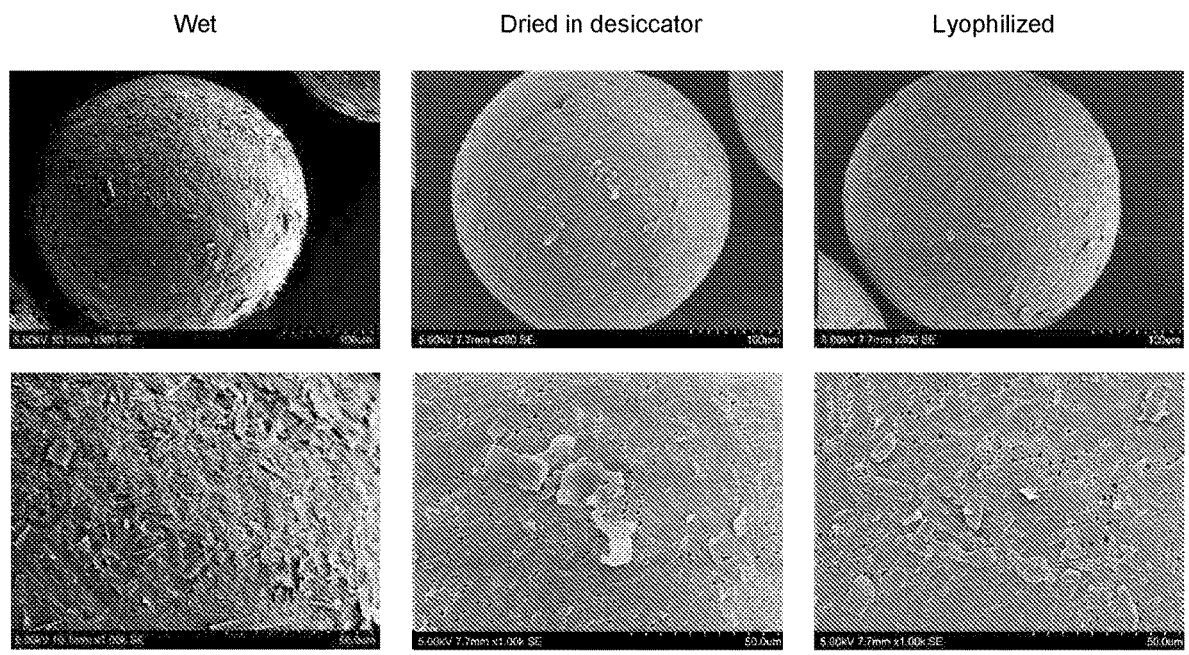
FIG. 5 shows that scanning electron microscopy of the microspheres revealed a similar distribution of crystalline material on the surface of the 'wet' and 'dry' microspheres.

Scanning electron microscopy of the microspheres revealed a similar distribution of crystalline material on the surface of the 'wet' and 'dry' microspheres (FIG. 5).

Figure 6:
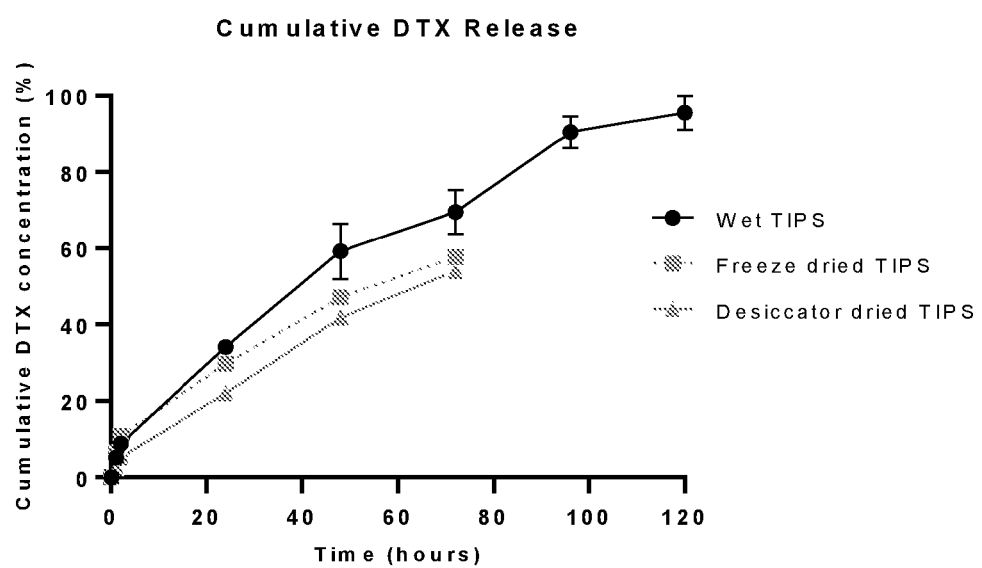
FIG. 6 shows that the cumulative release of docetaxel showed a similar release-rate trend for 'wet' and 'dry' docetaxel-loaded TIPS microspheres over an initial 72 hrs.

A plot of the cumulative release of docetaxel showed a similar release-rate trend for 'wet' and 'dry' docetaxel-loaded TIPS microspheres over the initial 72 hrs (FIG. 6).

Figure 7:
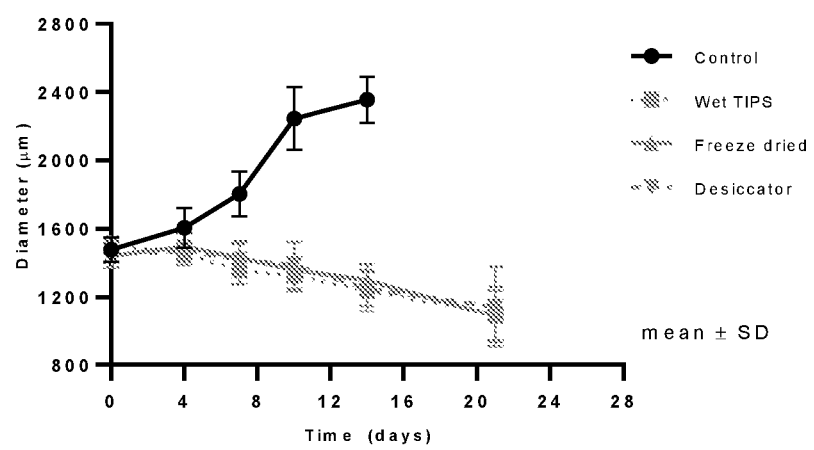
FIG. 7 shows that the diameter of the spheroids calculated from images acquired showed a significant reduction in size compared with both the starting size of the spheroid and spheroids in control groups measured at the same time-points, with a similar effect produced with perfusate collected from 'wet' and 'dry' docetaxel-loaded TIPS microspheres.

The diameter of the spheroids calculated from images acquired throughout the experiment showed a significant reduction in size compared with both the starting size of the spheroid and spheroids in control groups measured at the same time-points, with a similar effect produced with perfusate collected from 'wet' and 'dry' docetaxel-loaded TIPS microspheres (FIG. 7).

Example 5

Figure 8:
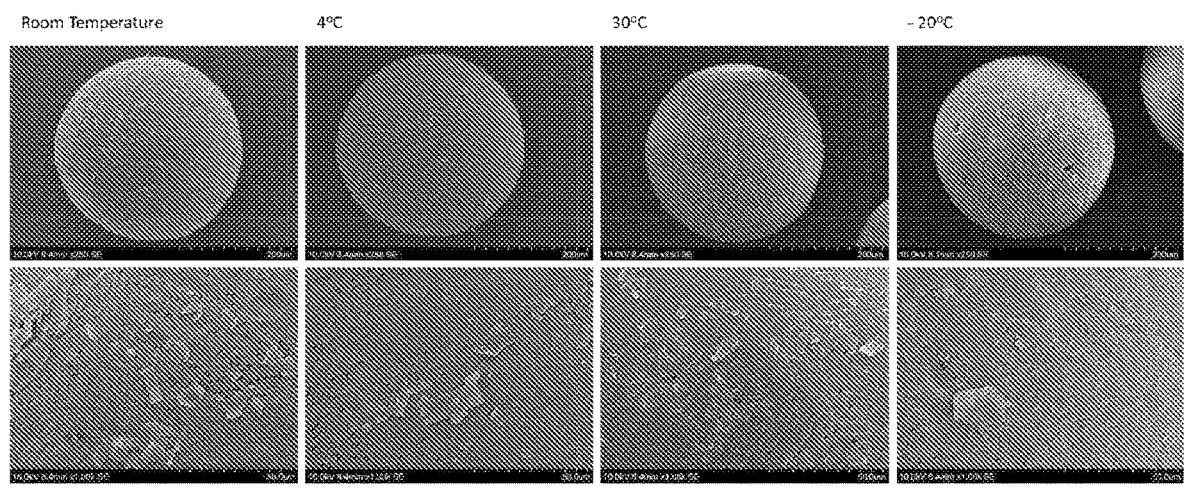
FIG. 8 shows SEM imaging confirming the presence of comparable quantities of docetaxel on the surface of TIPS microspheres after storage for 1 month.

Taxane-Loaded TIPS Microspheres are Stable when Stored Dry at Different Temperatures Long-term stability of the docetaxel-loaded TIPS microspheres will enable the product to be stored prior to clinical use. It is important to determine the climatic conditions under which the drug-loaded microspheres are stable. SEM imaging confirmed the presence of comparable quantities of docetaxel on the surface of TIPS microspheres after storage for 1 month (FIG. 8).

Example 6

Cytotoxic Activity of Sustained DTX Release Against Prostate Cancer Cells

Sustained drug release was observed from the microspheres when placed into a dynamic system simulating tissue perfusion. The release profile of DTX from TIPS microspheres was investigated using a dynamic perfusion system designed to simulate tissue perfusion in vivo during the intended clinical use of the drug-device combination. The perfusate containing DTX from the TIPS microspheres was collected at regular intervals and the quantity of DTX measured using UV absorbance. A plot of the cumulative release of DTX shows approximately 95% of the total amount of DTX loaded onto the TIPS microspheres was released over 5 days, with approximately one third being released during the first 24 hours (FIG. 9a). The quantity of DTX released at time-points beyond 5 days was below the detection threshold for the system used for UV absorbance. Therefore, two cell-based assays using PC3 prostate cancer cells were used to assess whether sustained cytotoxic activity existed for DTX released from TIPS microspheres in the perfusate. The colony formation assay revealed DTX released into the perfusate from the TIPS microspheres collected from all time points up to day 10 continued to have an inhibitory effect on the formation PC3 cell colonies (FIG. 9b). DTX present in the perfusate collected from days 1 to 4 completely suppressed the formation of all colonies. The formation of colonies after incubation in perfusates collected between days 5 to 8 was less than 25% of the number of colonies established in the control group containing no DTX. The number of colonies formed at day 10 was approximately 50% of the number of colonies established in the control group containing no DTX. Further confirmation of the sustained cytotoxic effect was revealed by morphological analysis of cells initially incubated in the DTX-TIPS perfusate for 48 hours followed by incubation in fresh complete medium for 1, 5 or 10 days (FIG. 9c). Phase contrast microscopy revealed characteristic morphological features of apoptosis including nuclear fragmentation, cell rounding due to shrinkage and cytoplasm condensation (indicative of early apoptosis) and apoptotic bodies (indicative of later-stage apoptosis).

As DTX was loaded on the surface of the microspheres, the release of DTX is predominately controlled by DTX crystal dissolution instead of via degradation of PLGA polymer. The crystals of DTX slowly dissolved with time, maintaining the concentration gradient for diffusion and resulting in a slow release over 5 days. This is beneficial since the drug-device combination will be implanted into the tumour resection site where its prolonged localised release will help eradicate residual or shed tumour cells released during surgery, minimising the chance of recurrence. The amount of DTX released into perfusate during the first 5 days of the DTX release assay, simulating release and local activity in vivo, was sufficient to achieve 100% toxicity against the PC3 cells in the colony forming assay and corresponded with approximately 95% of the DTX being released from the microspheres. DTX release from the microspheres continued beyond 5 days with the quantity of DTX present in the perfusates collected at daily intervals up to day 10 continuing to show mitotic arrest despite being below detection threshold of UV spec. PC3 prostate cancer cells incubated in the perfusates collected at later time points were reduced in number and showed phenotypic features typical of apoptosis.

Example 7

Cytotoxic Activity of Sustained DTX Release Against Prostate Cancer Spheroids

The drug released from the microspheres into perfusates collected at regular time intervals inhibited colony formation and exhibited sustained cytotoxicity against PC3 prostate cancer cells over 10 days. The cytotoxicity of DTX released from the DTX-TIPS combination in a more physiological 3D culture system was assessed as follows. 3D spheroids composed of PC3 cells were incubated with the perfusates collected daily over 12 days. The medium containing the spheroids was replaced on a daily basis with perfusate collected from the perfusion system on the corresponding day. The diameter and volume of the spheroids calculated from images acquired throughout the experiment showed a significant reduction in size compared with both the starting size of the spheroid and spheroids in control groups measured at the same time-points (FIG. 10a). PC3 cells cultured in 2D in tissue culture wells that were exposed to the perfusates collected daily over 12 days points exhibited morphological features of cytotoxicity similar to that observed in the colony formation assays (FIG. 10b). Live/Dead® staining with Calcein AM (an enzymatic fluorescent dye that passively enters and stains all metabolically-active cells) and Ethidium homodimer-1 (EthD-1; a fluorescent dye that only stains dead cells by binding to nucleic acid after passing through their compromised membranes) was performed on the spheroids incubated with perfusate collected over a day 12 period (FIG. 10c). Dead cells were visible towards the centre of the spheroids in both the DTX treated and control spheroids indicating the presence of a necrotic core due to the diffusional limits of oxygen and nutrients. Exposure of the spheroid to DTX in the Day 12 perfusate resulted in a reduction in the size of the spheroid diameter. PC3 cells in the remaining spheroid were stained positive for Calcein AM and EthD-1 but the proportion of EthD-1 positive cells at the periphery of the spheroids exposed to DTX was increased compared with the control group. The cytotoxic effect of DTX released from the DTX-TIPS particles against the 3D spheroid cultures was confirmed by transferring the spheroids at day 12 to tissue culture plates. No viable cells migrating from the spheroids were visible in the DTX treated spheroids, whereas cells could be seen migrating from the spheroids in the control group.

Example 8

DTX-TIPS Inhibits Tumour Growth In Vivo without Systemic Toxicity

Mice receiving IV DTX (as described in Prostate tumour formation in vivo and Tumour treatment in Example 1 above) exhibited progressive significant weight loss indicating systemic toxicity (FIG. 11a). No significant weight change was observed mice receiving DTX-TIPS compared with mice receiving IV saline or control TIPS microspheres indicating no systemic toxicity.

The volume of the tumours steadily increased over the study period in mice receiving control TIPS microspheres or IV saline (FIG. 11b). The volume of the tumours in mice receiving DTX-TIPS was substantially attenuated compared with the saline or control microsphere group. Tumour growth inhibition was most apparent in mice receiving IV DTX.

At day 14 there was no significant difference in tumour size increase between mice receiving DTX IV and DTX-TIPS, indicating DTX-TIPS is equally effective in preventing tumour growth (FIG. 11c). The increase in tumour size was significantly lower in mice receiving DTX-TIPS compared with mice receiving IV saline and the mice receiving control TIPS microspheres.

Example 9

Docetaxel-Loaded TIPS Microspheres Prepared Via Anti-Solvent Precipitation Provides Localised and Sustained Release of Non-Toxic Therapeutic Amounts of DTX that Effectively Stop Tumour Growth In Vivo Efficacy of docetaxel-loaded TIPS microspheres was verified in vivo following peritumoural injection in a PC3 xenograft tumour model, where the level of tumour growth inhibition was equivalent to the effect achieved with intravenous delivery of DTX. However, unlike intravenous delivery of DTX, implantation of DTX-TIPS microspheres was not accompanied by toxicity or elevated systemic levels of DTX in organ tissues or plasma.

Analysis of the DTX release profile in vivo was investigated in plasma collected from non-tumour bearing BALB/cAnNCrl mice. Detectable levels of DTX released from TIPS microspheres were observed at 1 hour and 24 hours post-administration. DTX was not detectable in the plasma thereafter. Plasma samples collected from the group receiving I.V. DTX once weekly for three weeks contained significantly higher levels of DTX at 1 hour (102-fold increase) and 24 hour (8-fold increase) post-administration compared to the DTX-TIPS group (p<0.01) (FIG. 12). The administration of I.V. DTX resulted in detectable levels of DTX remaining in the plasma at 48 hours and 72 hours and also at day 10 and day 15, corresponding to the second and third doses of I.V. DTX delivered at day 7 and day 14.

The antineoplastic activity and systemic toxicity of DTX-TIPS microspheres was investigated in vivo using a human prostate tumour xenograft model in NSG mice. PC3 cells were subcutaneously transplanted into immunocompromised mice. At day 14 post-cell injection, palpable tumours had formed, measuring 0.03-0.05 cm3. Peritumoural delivery of TIPS microspheres (+/−DTX) and retention at the site of implantation was confirmed by histology, with the microspheres remaining in situ for the duration of the study (FIG. 13).

Tumour volume measurements in mice receiving I.V. DTX did not increase during the study (FIG. 14a). In mice receiving DTX-TIPS microspheres, there was no significant increase in tumour volume compared with the mice receiving I.V. DTX until day 21 (p<0.05). At this time-point, the increase in tumour volumes in the group treated with DTX-TIPS microspheres was approximately 6-fold compared with the group treated with saline only at the same time-point. In mice receiving either TIPS microspheres only or I.V. saline, the tumour volume was significantly increased at day 16 (p<0.05) and day 14 (p<0.05), respectively, compared with the mice receiving I.V. DTX. Qualitative macroscopic assessment of the resected tumours at the end of the study revealed visibly smaller tumours collected from the groups treated with DTX (FIG. 14b).

Significant toxicity was associated I.V. delivery of DTX, exhibited by progressive weight loss from day 7 onwards, leading to −7.0%±2.3% at day 28 and −12.7%±3.5% at day 35 compared with the starting weight (p<0.0001; weight loss exceeded >15% at day 35 in 3/7 mice). In contrast, no significant weight loss was observed in the groups receiving DTX-TIPS microspheres, TIPS microspheres only or I.V. saline (FIG. 14c).

Tissue levels of DTX in explanted organs (heart, kidney, lung, spleen, liver) were analysed days 1, 10 and 35 post-administration as per Table 1 below. Elevated levels of DTX were detected in all organs at all time-points following I.V. administration of DTX compared with DTX-TIPS administration, with the exception of the liver and spleen at day 35, where DTX was not detectable for either treatment group.

TABLE 1

DTX concentration measured in tissues from explanted organs at days 1, 10 and 35 following administration of DTX-TIPS microspheres or I.V. DTX. (n = 5-6 samples for each group per time-point).

| | DTX concentration (nM) Days post-administration | | | | | |
|---|---|---|---|---|---|---|
| | 1 | | 10 | | 35 | |
| | DTX-TIPS | I.V. | DTX-TIPS | I.V. | DTX-TIPS | I.V. |
| Heart | 11.25 ± 6.50 | 339.87 ± 42.88 | 0.00 ± 0.00 | 90.08 ± 19.43 | 0.00 ± 0.00 | 0.97 ± 2.37 |
| Kidney | 18.93 ± 8.94 | 114.78 ± 22.36 | 5.28 ± 7.74 | 114.78 ± 22.36 | 0.00 ± 0.00 | 1.167 ± 2.86 |
| Lung | 0.00 ± 0.00 | 641.02 ± 92.42 | 4.28 ± 5.94 | 256.08 ± 35.54 | 0.00 ± 0.00 | 13.75 ± 16.20 |
| Liver | 10.05 ± 5.85 | 87.30 ± 7.85 | 16.22 ± 22.84 | 27.04 ± 11.88 | 0.00 ± 0.00 | 0.00 ± 0.00 |
| Spleen | 0.00 ± 0.00 | 14.07 ± 11.86 | 0.00 ± 0.00 | 35.28 ± 51.89 | 0.00 ± 0.00 | 0.00 ± 0.00 |

All cited references are herein incorporated in their entirety.

The invention claimed is:

1. A method for attaching a non-water soluble active pharmaceutical ingredient (API) to a microsphere produced by thermally induced phase separation (TIPS) comprising:
  i) mixing the microsphere with an aqueous solution to form a first composition, wherein the microsphere comprises poly(lactide-co-glycolide) (PLGA) and, after mixing, has a hydrophobic surface;
  ii) dissolving the non-water soluble API in a first solvent and subsequently adding the non-water soluble API dissolved in the first solvent to the first composition to form a second composition, wherein the non-water soluble API is a chemotherapeutic taxane; and iii) mixing the second composition, wherein the step of mixing the second composition causes the non-water soluble API to precipitate in crystalline form onto the hydrophobic surface of the microsphere, whereby the non-water soluble API is bound to the surface of the microsphere.

2. The method of claim 1, wherein the microspheres are mixed with the aqueous solution in a vessel and wherein the vessel is inverted during formation of the second composition.

3. The method of claim 1 wherein the thermally induced phase separation comprises:
   i) dissolving PLGA in a second solvent to form a solution;
   ii) quenching droplets of the solution in a quenching fluid; and
   iii) freeze-drying the resultant spheres.

4. The method of claim 3, wherein:
   i) the second solvent is dimethyl carbonate; and/or
   ii) the quenching fluid is liquid nitrogen.

5. The method of claim 1, wherein the non-water soluble API is cabazitaxel, paclitaxel or docetaxel.

6. The method of claim 1, wherein the first solvent is an alcohol.

7. The method of claim 1, further comprising:
   a. removing any unbound non-water soluble API from the second composition by washing with an aqueous solution; and/or
   b. mixing of the second composition is performed via rotation.

8. A microsphere produced by thermally induced phase separation which has a non-water soluble API precipitated onto and bound to its surface in crystalline form, wherein the non-water soluble API is a chemotherapeutic taxane, and wherein the microsphere comprises PLGA.

9. A microsphere produced by thermally induced phase separation which has a non-water soluble API precipitated onto and bound to its surface in crystalline form, wherein the non-water soluble API is a chemotherapeutic taxane, wherein the microsphere comprises PLGA, and wherein the non-water soluble API is bound to the microsphere via the method of claim 1.

10. The microsphere of claim 9, wherein the thermally induced phase separation comprises:
    i) dissolving PLGA in a solvent to form a solution;
    ii) quenching droplets of the solution in a quenching fluid; and
    iii) freeze-drying the resultant spheres.

11. The microsphere of claim 10, wherein:
    i) the solvent is dimethyl carbonate; and/or
    ii) the quenching fluid is liquid nitrogen.

12. The microsphere of claim 9, wherein the non-water soluble API is cabazitaxel, paclitaxel or docetaxel.

13. The microsphere of claim 9, wherein the microsphere has a diameter of from 10 to 900 μm.

14. A method of treating cancer comprising administering to a subject in need of such treatment, a composition comprising the microsphere of claim 8.

15. The method of treating cancer according to claim 14, wherein the cancer is prostate cancer.

16. A kit for treating cancer comprising:
    i) TIPS microspheres provided in a sealed vessel, wherein the TIPS microspheres comprise PLGA;
    ii) a non-water soluble API dissolved in a first solvent, wherein the non-water soluble API is a chemotherapeutic taxane; and
    iii) a carrier vehicle.

* * * * *